(12) United States Patent
Pan

(10) Patent No.: US 10,514,571 B2
(45) Date of Patent: Dec. 24, 2019

(54) DISPLAY PANEL AND METHOD OF FABRICATING A DISPLAY PANEL

(71) Applicant: Himax Display, Inc., Tainan (TW)

(72) Inventor: Po-Hung Pan, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 15/928,064

(22) Filed: Mar. 21, 2018

(65) Prior Publication Data

US 2019/0293994 A1    Sep. 26, 2019

(51) Int. Cl.
  *G02F 1/1335* (2006.01)
  *G02F 1/1339* (2006.01)
  (Continued)

(52) U.S. Cl.
  CPC ...... *G02F 1/133514* (2013.01); *G02F 1/1339* (2013.01); *G02F 1/133502* (2013.01);
  (Continued)

(58) Field of Classification Search
  CPC ......... G02F 1/133502; G02F 1/133509; G02F 1/133512; G02F 1/133514; G02F 1/133528; G02F 1/1335; G02F 1/1343; G02F 1/1333; G02F 1/1337; G02F 1/133711; G02F 1/1339; G02F 1/1341; G02F 2001/133521; G02F 2001/13354; G02F 2001/133624; G02F 2203/01; G02F 2203/04;
  (Continued)

(56) References Cited

U.S. PATENT DOCUMENTS

| | | | |
|---|---|---|---|
| 5,629,056 A | * | 5/1997 | Koike ............... G02F 1/133753 349/123 |
| 6,638,624 B2 | | 10/2003 | Ozawa |

(Continued)

FOREIGN PATENT DOCUMENTS

| | | |
|---|---|---|
| JP | H10239671 | 9/1998 |
| JP | 2000081846 | 3/2000 |

(Continued)

OTHER PUBLICATIONS

"Search Report of Europe Counterpart Application", dated Oct. 19, 2018, p. 1-p. 9.

(Continued)

*Primary Examiner* — Thoi V Duong
(74) *Attorney, Agent, or Firm* — JCIPRNET

(57) ABSTRACT

A display panel according to an embodiment has a first region surrounding a second region. The display panel includes a top substrate, a bottom substrate opposite to the top substrate, a sealant located within the first region, and a display medium layer encased by the top substrate, the bottom substrate, and the sealant. A patterned light shielding layer is disposed on an upper surface of the top substrate in the first region. A light filtering layer is disposed on the top substrate in the second region of the display panel. The light filtering layer causes a reduction of a transmittance of light of wavelength ranged from about 300 nm to about 410 nm by at least about 20% to about 50%, and a transmittance of the light filtering layer for light of wavelength ranged from about 450 nm to about 800 nm is at least about 80% to 95%.

20 Claims, 25 Drawing Sheets

(51) Int. Cl.
*G02F 1/1337* (2006.01)
*G02F 1/1333* (2006.01)

(52) U.S. Cl.
CPC .. *G02F 1/133512* (2013.01); *G02F 1/133711* (2013.01); *G02F 2001/133354* (2013.01)

(58) Field of Classification Search
CPC ........... G02F 2203/05; G02F 2203/055; G02B 5/208; G02B 5/20; G02B 5/003; G02B 6/005; G02B 6/0053; G02B 1/14
See application file for complete search history.

(56) References Cited

U.S. PATENT DOCUMENTS

| | | | |
|---|---|---|---|
| 7,697,092 | B2 | 4/2010 | Yi et al. |
| 2001/0036554 | A1* | 11/2001 | Jin .......................... B32B 27/08 428/412 |
| 2004/0114114 | A1* | 6/2004 | Yano ...................... G02B 5/283 353/84 |
| 2012/0062486 | A1* | 3/2012 | Rho ........................ G06F 3/041 345/173 |
| 2012/0224131 | A1 | 9/2012 | Kunimatsu et al. |
| 2013/0058020 | A1* | 3/2013 | Jo ........................ G02F 1/1345 361/679.01 |
| 2014/0071368 | A1 | 3/2014 | Kim et al. |
| 2015/0028284 | A1 | 1/2015 | Gotti et al. |
| 2015/0028294 | A1 | 1/2015 | Kim et al. |
| 2016/0146988 | A1* | 5/2016 | Kim ...................... G02B 5/208 349/61 |
| 2017/0068128 | A1 | 3/2017 | Lim et al. |
| 2019/0131568 | A1* | 5/2019 | Li ....................... H01L 51/5253 |

FOREIGN PATENT DOCUMENTS

| | | |
|---|---|---|
| JP | 2002098981 | 4/2002 |
| JP | 2002140012 | 5/2002 |
| JP | 2003228053 | 8/2003 |
| JP | 2008218423 | 9/2008 |
| JP | 2012103577 | 5/2012 |
| JP | 2012211305 | 11/2012 |
| JP | 2013025139 | 2/2013 |
| KR | 20040034544 | 4/2004 |
| KR | 20120049066 | 5/2012 |
| KR | 20140079081 | 6/2014 |
| KR | 20170032897 | 3/2017 |
| TW | 200928457 | 7/2009 |
| TW | 201430454 | 8/2014 |
| TW | I521243 | 2/2016 |
| WO | 2017141903 | 8/2017 |

OTHER PUBLICATIONS

"Office Action of Korea Counterpart Application," dated May 8, 2019, p. 1-p. 11.
"Office Action of Japan Counterpart Application", dated Jul. 30, 2019, pp. 1-7.
"Office Action of Taiwan Counterpart Application", dated Jun. 13, 2019, pp. 1-6.
"Office Action of Korea Counterpart Application," with English translation thereof, dated Aug. 28, 2019, p. 1-p. 11.

* cited by examiner

DISPLAY PANEL AND METHOD OF FABRICATING A DISPLAY PANEL

BACKGROUND OF THE INVENTION

1. Field of the Invention

The present invention generally relates to an electronic device and a method of fabricating the same, in particular, to a display panel and a method of fabricating a display panel.

2. Description of Related Art

In a typical liquid crystal display panel, a layer comprising liquid crystals material is sandwiched between a top substrate and a bottom substrate. The top substrate and the bottom substrate are assembled together via a sealant or an adhesive. In addition, the liquid crystal display panel may further include other components such as active devices, electrodes, alignment layer, etc. formed between the top substrate and the bottom substrate. Some of the components may have lower tolerance to UV (ultraviolet) light. If a UV-curable adhesive is used to assemble the top substrate and the bottom substrate, an irradiation step with UV light may accelerate the aging or the deterioration of those UV sensitive components. Alternatively, an external UV light may also have negative influence on those UV sensitive components so that the lifetime of the liquid crystal panel may decrease.

SUMMARY OF THE INVENTION

Accordingly, the present invention is directed to a display panel including a light filtering layer.

Accordingly, the present invention is directed to a method of fabricating a display panel including a light filtering layer.

According to an embodiment, a display panel may have a first and a second region located beside the first region. A display panel may include a top substrate, a bottom substrate disposed opposite to the top substrate, a sealant disposed between the top substrate and the bottom substrate and located within the first region of the display panel, and a display medium layer encased by the top substrate, the bottom substrate, and the sealant. A patterned light shielding layer is disposed on an upper surface of the top substrate in the first region of the display panel. A light filtering layer is disposed on the top substrate in the second region. The light filtering layer may cause a reduction of transmittance of wavelength ranged from about 300 nm to about 410 nm by at least about 20% to about 50%, and a transmittance of the light filtering layer for light of wavelength ranged from about 450 nm to about 800 nm may be at least about 80% to 95%. Normally a transmittance of the top substrate used in a display panel at wavelength of 300 nm is about 30% and about 92% at wavelength of 410 nm.

According to an embodiment, the light filtering layer may reveal the first region of the display panel.

According to an embodiment, a transmittance of the light filtering layer for light of wavelength ranged from about 500 nm to about 800 nm is at least about 85% to 95%.

According to an embodiment, a material of the light filtering layer may be an inorganic material.

According to an embodiment, a material of the light filtering layer may include ZnO or doped ZnO with other metal such as magnesium.

According to an embodiment, the light filtering layer is constituted by a plurality of thin films, and different thin films of the plurality of thin films may include different materials.

According to an embodiment, the top substrate has a recess in the second region of the display panel, and the light filtering layer is disposed therein.

According to an embodiment, the top substrate has a recess in the first region of the display panel, and the patterned light shielding layer is disposed therein.

According to an embodiment, an anti-reflective layer may be further disposed on the upper surface of the top substrate in the second region of the display.

According to an embodiment, the patterned light shielding layer in the first region of the display panel may be coplanar with a portion of the anti-reflective layer in the second region of the display panel.

According to an embodiment, the anti-reflective layer may extend in the first region of the display panel, and the anti-reflective layer may be in contact with the patterned light shielding layer.

According to an embodiment, the light filtering layer may be in contact with an upper surface of the anti-reflective layer.

According to an embodiment, the display panel may further include a hydrophobic layer extending on the second region of the display panel.

According to an embodiment, the display panel may further include an alignment layer contacting the display medium layer, and the alignment layer is made of an organic material.

According to an embodiment, a method of fabricating a display panel may include the followings steps. Assembling a top substrate with a bottom substrate through a sealant, wherein the sealant is located in a first region surrounding and beside a second region. A display medium layer is formed between the top substrate and the bottom substrate in the second region, wherein the display medium layer is encased by the top substrate, the bottom substrate, and the sealant. A light filtering layer is formed on the upper surface of the top substrate in the second region of the display panel, wherein the light filtering layer causes a reduction of a transmittance of light of wavelength ranged from about 300 nm to about 410 nm by at least about 20% to about 50%, and a transmittance of the light filtering layer for light of wavelength ranged from about 450 nm to about 800 nm is at least about 80% to about 95%. A patterned light shielding layer is formed on the upper surface of the top substrate in the first region.

According to an embodiment, the sealant is a UV-curable sealant.

According to an embodiment, the light filtering layer is formed before the top substrate and the bottom substrate are assembled through the sealant, and the light filtering layer reveals the first region.

According to an embodiment, when the sealant is being cured, a mask is used for shielding the second region, and the mask is removed after the sealant is cured.

According to an embodiment, the light filtering layer is further annealed at a temperature in a range from about 150° C. to about 400° C. for a time in a range from about 10 minutes to about 3 hours.

According to an embodiment, a portion of the top substrate is removed before forming the light filtering layer to form a recess, wherein at least one of the light filtering layer and the patterned light shielding layer is disposed in the recess.

According to an embodiment, an anti-reflective layer is further formed on the upper surface of the top substrate.

According to an embodiment, a hydrophobic layer is further formed before forming the patterned light shielding layer, and the hydrophobic layer is blank in the first region.

According to an embodiment, an alignment layer contacting the display medium layer is further formed, and a material of the alignment layer is an organic material.

In view of the above, the light filtering layer is disposed on the outer surface of the top substrate at the second region of the display panel. The light filtering layer may attenuate incident UV light to prevent the UV sensitive components from the UV light irradiation. Accordingly, the light filtering layer of the display panel may provide the desired protective function for the UV sensitive components of the display panel. Further functionalization of an upper surface of the light filtering layer may also be possible to provide anti-dust or anti-water property.

BRIEF DESCRIPTION OF THE DRAWINGS

The accompanying drawings are included to provide further understanding of the invention, and are incorporated in and constitute a part of this specification. The drawings illustrate embodiments of the invention and, together with the description, serve to explain the principles of the invention.

Figure 1:
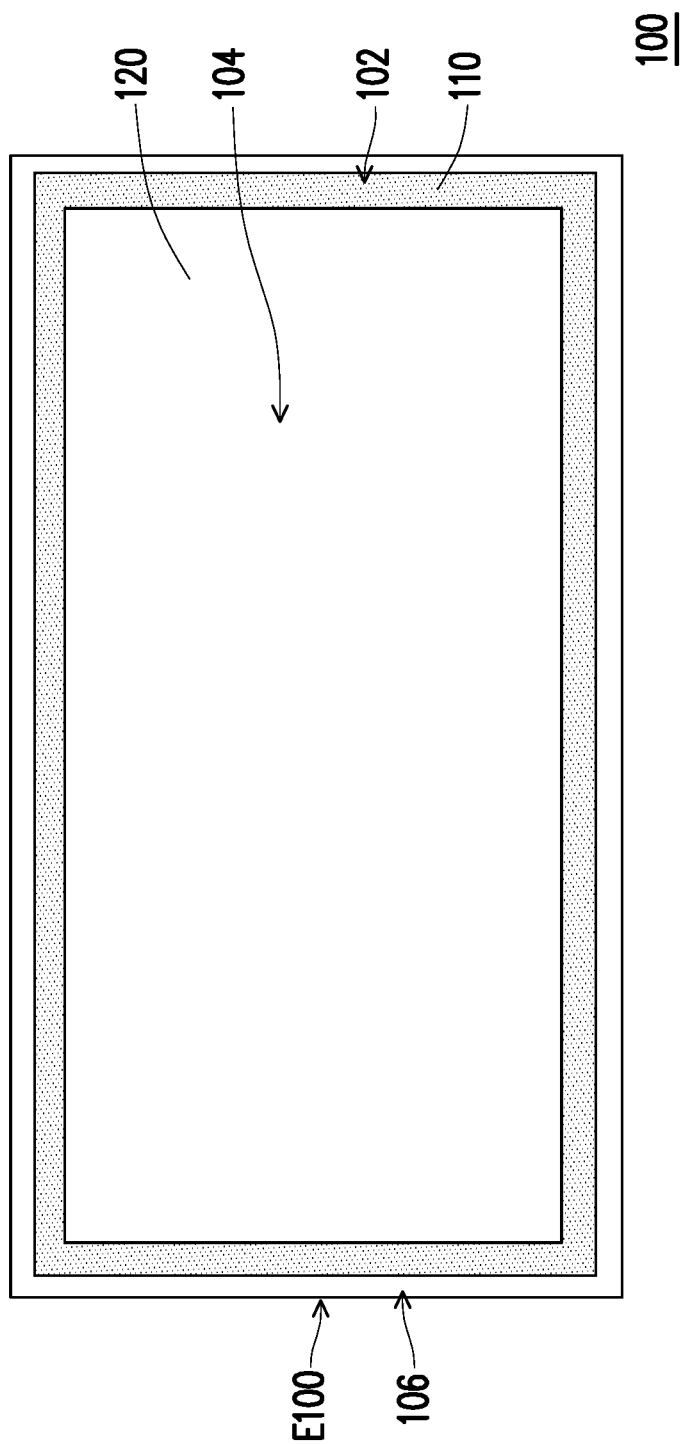
FIG. 1 schematically illustrates a top view of a display panel in accordance with an embodiment of the present disclosure.

In the drawings, the hydrophobic layer 180 is represented with a significantly enlarged thickness compared to the other components of the embodiments for the sake of clarity of the drawings.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the descriptions to refer to the same or like parts.

In the disclosure of the present invention, the locution "an element A is disposed on an element B", used to describe a positional relationship, encompasses the possibilities of one or multiple other elements disposed between the element A and the element B, as well as the case of no other elements existing between the element A and the element B.

FIG. 1 schematically illustrates a top view of a display panel 100 in accordance with an embodiment of the present disclosure. The display panel 100 may include a first region 102, and a second region 104 located beside the first region 102. The first region 102 may have a frame-like pattern when viewed from the top, and may suiTound the second region 104. In addition, the display panel 100 may include a patterned light shielding layer 110 located within the first region 102 and a light filtering layer 120 located within the second region 104. Specifically, the patterned light shielding layer 110 has a frame-like pattern arranged along the first region 102 in the present embodiment and surrounds the light filtering layer 120. The first region 102 may be considered as the region where the patterned light shielding layer 110 is disposed and the second region 104 may be considered as the region where the light filtering layer 120 is disposed.

The display panel 100 may further include a peripheral region 106. The peripheral region 106 may have a frame-like pattern when viewed from the top as shown in FIG. 1, and may surround the first region 102. In other words, the peripheral region 106 may be located between the first region 102 and an outer edge E100 of the display panel 100. A portion or the whole peripheral region 106 may not be present in a display panel 100 according to an alternative embodiment, for example because it has been removed during the fabrication process.

The patterned light shielding layer 110 has a light shielding effect. Therefore, the display light of the display panel 100 is obstructed or shielded by the patterned light shielding layer 110, so that the displayed image is presented in the second region 104 that may be considered as the display area. A transmittance of the patterned light shielding layer 110 for visible light may be so low that human eye may not perceive the visible light passing through the patterned light shielding layer 110. The light filtering layer 120 may cause a reduction of a transmittance of light of wavelength ranged from about 300 nm to about 410 nm by at least about 20% to about 50%, and a transmittance of the light filtering layer 120 for light of wavelength ranged from about 450 nm to about 800 nm is at least about 80% to 95%. Namely, the visible light transmittance in the second region 104 may be significantly greater than the visible light transmittance in the first region 102, so that the displayed image of the display panel 100 is presented in the second region 104.

Figure 2A:
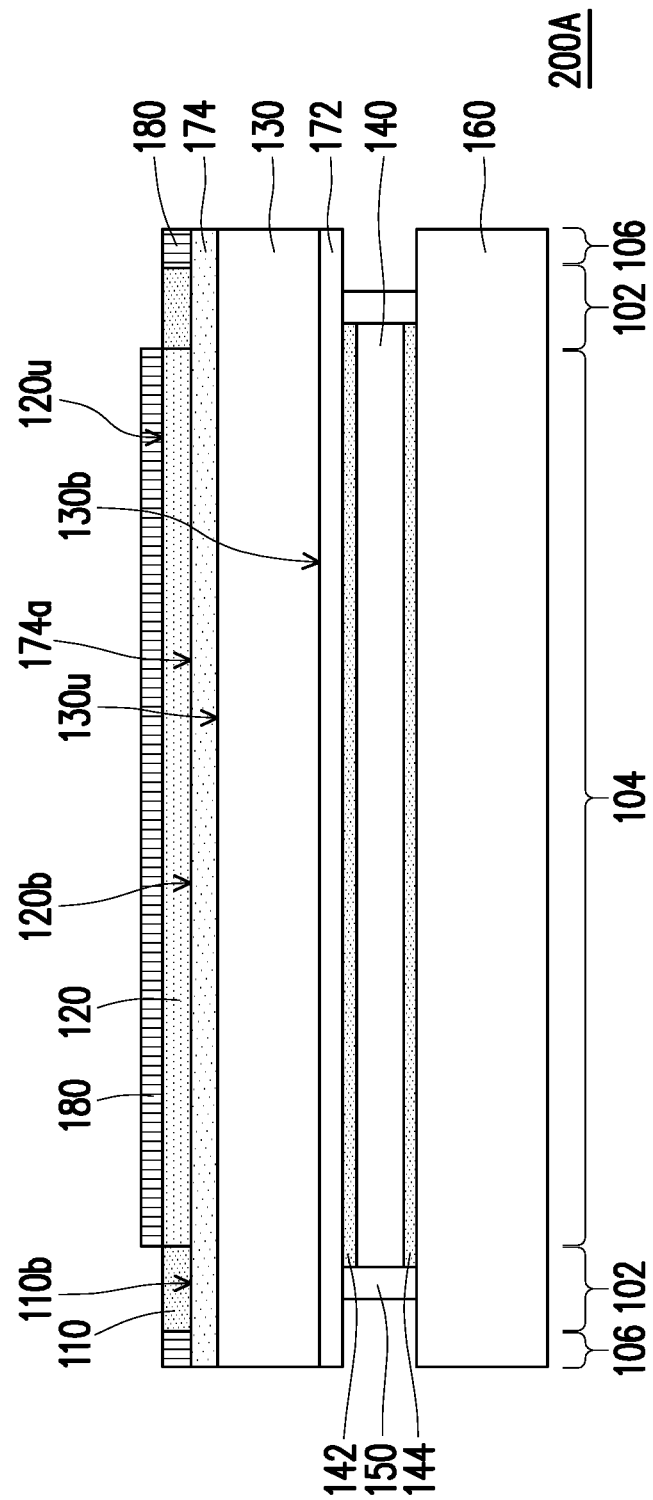
FIG. 2A shows a cross section of a display panel according to some embodiments of the present disclosure.
Figure 2B:
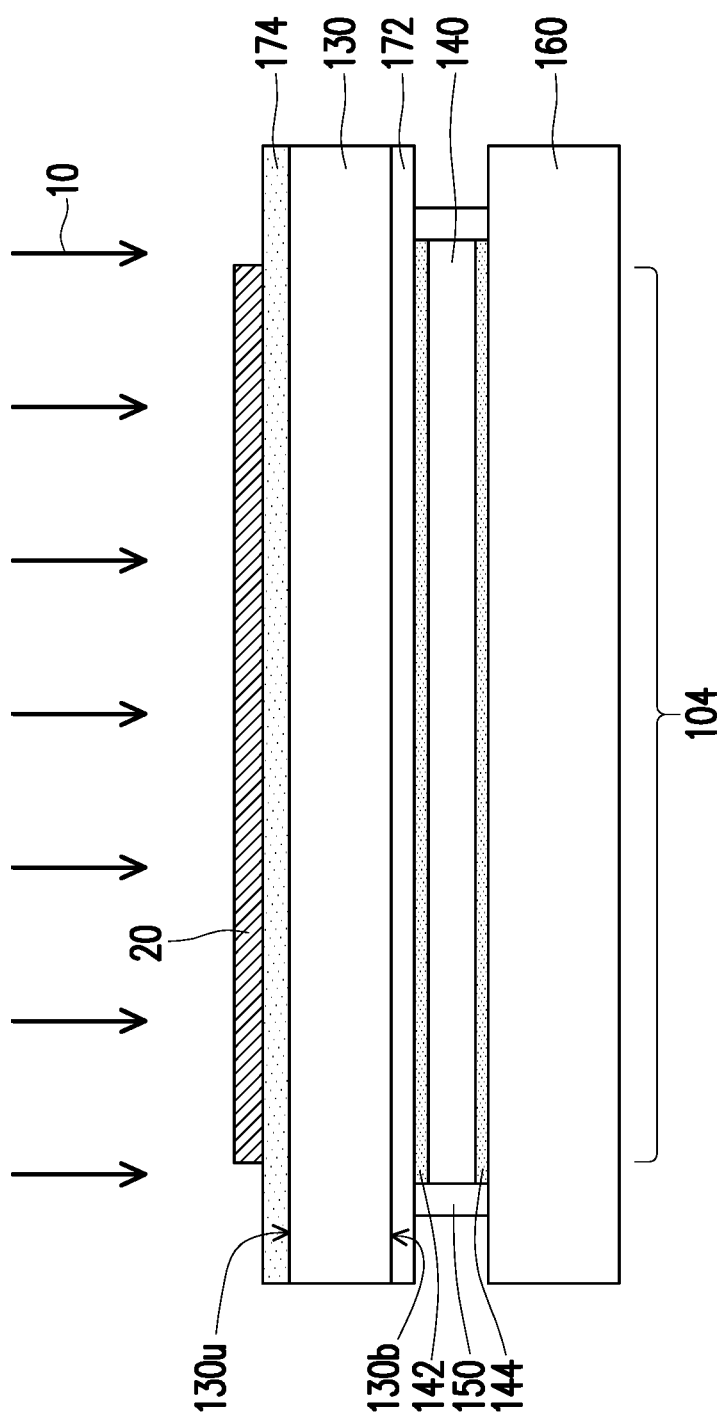
FIGS. 2B-2E show schematic cross sections of a display panel undergoing a portion of the steps of a fabricating method in accordance with an embodiment of the present disclosure.

FIG. 2A shows a cross section of a display panel 200A according to an embodiment of the present disclosure. As shown in the cross section of FIG. 2A, the display panel 200A may include a patterned light shielding layer 110, a light filtering layer 120, a top substrate 130, a display medium layer 140, a sealant 150, and a bottom substrate 160. Specifically, the display panel 200A may have a top view similar to that illustrated in FIG. 1 and the arrangements of the patterned light shielding layer 110 and the light filtering layer 120 in the top view may be similar to those illustrated in FIG. 1.

Specifically, the display panel 200A may have the first region 102, the second region 104 and the peripheral region 106. The top substrate 130 is positioned opposite to the bottom substrate 160. The display medium layer 140 is disposed between the top substrate 130 and the bottom substrate 160, and is surrounded by the sealant 150. In addition, the patterned light shielding layer 110 and the light filtering layer 120 are both disposed on the upper surface 130u of the top substrate 130. The patterned light shielding layer 110 is located in the first region 102 and the light filtering layer 120 is located in the second region 104.

The display panel 200A may further include an electrode layer 172 and an anti-reflective layer 174. The electrode layer 172 is disposed on the bottom surface 130b of the top substrate 130 closer to the display medium layer 140 so that the electrode layer 172 is located between the top substrate 130 and the display medium layer 140. The anti-reflective layer 174 may be disposed on the upper surface 130u of the top substrate 130. The anti-reflective layer 174 may extend over the whole upper surface 130u of the top substrate 130, whilst the patterned light shielding layer 110 may be disposed on the anti-reflective layer 174 within the first region 102. A material of the anti-reflective layer 174 may be silicon oxide or titanium oxide. The antireflective layer 174 may be a stacked multi-layer thin film which may have a structure of $SiO_x$—$TiO_x$—$SiO_x$—$TiO_x$—$SiO_x$, for example, but it is not limited thereto. The thickness of each individual $SiO_x$ layer of the stacked multi-layer thin film may be in a range from 5 nm to 300 nm, while the thickness of each individual $TiO_x$ layer of the stacked multi-layer thin film may be in a range from 5 nm to 100 nm. The reflective index at wavelength of 550 nm of $SiO_x$ and $TiO_x$ may be close to 1.5 and 2.3, respectively.

The display medium layer 140 may be constructed by a layer of liquid crystals, so that the top substrate 130, the bottom substrate 160, the display medium layer 140, and the sealant 150 may serve as a liquid crystals cell, but it is not limited thereto. The display panel 200A may further include two alignment layers 142 and 144 to orient the material of the display medium layer 140. The alignment layer 142 is disposed on the top substrate 130 and located between the top substrate 130 and the display medium layer 140. The alignment layer 144 is disposed on the bottom substrate 160 and located between the bottom substrate 160 and the display medium layer 140. The display medium layer 140 may be in contact with the alignment layers 142 and 144. In some embodiments, only one of the alignment layers 142 and 144 may be present according to the property of the display medium layer 140. The display panel 200A in some alternative embodiments may not include an alignment layer. The alignment layers 142 and 144 may be made of inorganic materials or organic materials. For example, the material for the alignment layers 142 and 144 may be polyimide, or obliquely deposited silicon oxide by thermal evaporation.

In addition, though the drawing presents the bottom substrate 160 as a plate-like structure, the bottom substrate 160 may be a transistor array substrate comprised of another support substrate such as a glass plate, or a silicon backplane (not shown) and a transistor array such as a thin film transistor array or a COMS (Complementary Metal-Oxide Semiconductor) device array (not shown) thereon, wherein the transistor array and the electrode layer 172 may be used for providing the driving electric field to drive the display medium layer 140. In some embodiments, the display panel 200A may be a Thin Film Transistor Liquid Crystal Display (TFT-LCD) panel or an LCoS (Liquid Crystal on Silicon) display panel. In some alternative embodiments, the electrode layer 172 may be omitted based on the driving circuit design of the display panel 200A. The electrode layer 172 may be made of ITO or other material that is conductive and transparent to the display light, and the top substrate 130 may be made of glass, but they are not limited thereto.

The patterned light shielding layer 110 may be disposed on the anti-reflective layer 174 in the first region 102 of the display panel 200A and in contact with the upper surface 174a of the anti-reflective layer 174. The patterned light shielding layer 110 may present a sharp pattern and edges with good linearity. The light filtering layer 120 may be disposed in the second region 104 of the display panel 200A, on top of the anti-reflective layer 174. Similar to the patterned light shielding layer 110, the light filtering layer 120 may be in contact with the upper surface 174a of the anti-reflective layer 174. The bottom surface 120b of the light filtering layer 120 may be coplanar with the bottom surface 110b of the patterned light shielding layer 110. The light filtering layer 120 may be surrounded by the patterned light shielding layer 110, in the same way as the second region 104 of the display panel 200A may be surrounded by the first region 102.

The light filtering layer 120 may present a lower transmittance for UV light than the top substrate 130 and/or the anti-reflective layer 174. For example, the light filtering layer 120 may cause a reduction from about 20% to about 50% of the transmittance of light of wavelength ranged from about 300 nm to about 410 nm. In other words, if the transmittance of light of wavelength ranged from about 300 nm to about 410 nm is X % when passing through a stack of the electrode layer 172, the top substrate 130 and the anti-reflective layer 174, the transmittance of light of wavelength ranged from about 300 nm to about 410 nm may be Y % when passing through a stack of the electrode layer 172, the top substrate 130, the anti-reflective layer 174 and the light filtering layer 120, and the transmittance difference (X %-Y %) may be at least 20%. In other words, the light filtering layer 120 may reduce the amount of incident UV light that, thereby offering protection against potentially damaging radiation to the sensitive components of the display panel 200A.

At the same time, the light filtering layer 120 may present a high transmittance of visible light, to preserve the color fidelity of the display panel 200A. The light filtering layer 120, for example, may transmit at least about 80% to about 95% of light of wavelength in the range from about 450 nm to about 500 nm. In some alternative embodiments, a transmittance of the light filtering layer 120 for a light of wavelength in the range from about 500 nm to about 800 nm may be more than 85% to about 95%. That is, the presence of the light filtering layer 120 does not affect the ability of the display panel 200A to faithfully reproduce colors, while protecting the photosensitive components against a harmful portion of the light spectrum such as UV light.

The light filtering layer 120 may be made of any suitable material presenting the desired transmittance characteristics. In some embodiments, the light filtering layer 120 may be made of an inorganic material, and such inorganic material may include zinc oxide or zinc oxide doped with magnesium or manganese, according to the formulae $Zn_{(1-x)}Mg_xO$ or $Zn_{(1-x)}Mn_xO$, where x represents the fraction of zinc atoms substituted by atoms of the dopant (Mg or Mn). In some alternative embodiments, the light filtering layer 120 may be constituted by a plurality of films of different materials. For example, a first film could include zinc oxide, and a second film could include cerium oxide or copper oxide. The presented formulations are only exemplary, and they are not intended to limit the number, sequence or compositions of the plurality of films that may constitute the light filtering layer 120. The thickness of the light filtering layer 120 is not particularly limited, and it may be adjusted depending on the design requirements. Similarly, no restrictions are posed on the shape of the light filtering layer 120, as it may be formed according to any desired pattern. For example, the light filtering layer 120 may present squared or rounded corners.

In the present embodiment, the upper surface 120u of the light filtering layer 120 and the upper surface 174a of the anti-reflective layer 174 in the peripheral region 106 may be subjected to a hydrophobic modification such as a silane surface treatment to form a layer of hydrophobic material. In a microscopic view, the upper surface 120u of the light filtering layer 120 and the upper surface 174a of the anti-reflective layer 174 in the peripheral region 106 may be functionalised with hydrophobic material to form a hydrophobic layer 180, thus gaining hydrophobic properties. The material forming the hydrophobic layer 180 may include silanes, fluorinated silanes, long-chain alcohols or acids, but is not limited thereto. The thickness of the hydrophobic layer 180 may be in the range from about 0.1 to about 90 nanometers. The hydrophobic layer 180 may serve multiple purposes. For example, the hydrophobic layer 180 may further protect the display panel 200A against infiltrating water from the surrounding environment. Furthermore, the exposed hydrophobic layer 180 may help during the manufacturing process to form a patterned light shielding layer 110 with sharp edges and good linearity.

In FIGS. 2B-2F are shown schematic cross sections of a fabricating method for the display panel 200A of FIG. 2A according to an embodiment of the present disclosure. In the embodiment, shown in FIG. 2B, the top substrate 130 and the bottom substrate 160 are assembled through the sealant 150 whilst the display medium layer 140 is filled between the top substrate 130 and the bottom substrate 160 and surrounded by the sealant 150. The blanket anti-reflective layer 174 may be formed on the upper surface 130u of the top substrate 130, and the electrode layer 172 may be formed on the bottom surface 130b of the top substrate 130 opposite to the upper surface 130u. In addition, the alignment layer 142 and the alignment layer 144 are respectively disposed on the top substrate 130 and the bottom substrate 160 and both in physical contact with the display medium layer 140. In the present embodiment, the sealant 150 may be a UV-curable sealant. In other words, an irradiation with a curing light 10 having wavelength below about 400 nm (UV light) may be required. The curing light 10 may have maximum intensity around 365 nm, depending on the material of the sealant 150 used. Alternatively, the sealant 150 may be mainly cured at UV light of wavelength of 365 nm. The curing light 10 required during the irradiation step may be damaging for some existed components, for example, the two alignment layers 142 and 144. For example, if the alignment layers 142 and 144 are made of organic alignment material, the alignment layers 142 and 144 may be sensitive to high doses or prolonged exposure to UV light. That is, the alignment layers 142 and 144 may be damaged upon long or intense irradiation with curing light 10 having wavelength comprised in range from about 250 nanometers (nm) to about 410 (nm). Therefore, in the present embodiment, the curing light 10 is provided to irradiate and cure the sealant 150 while a mask 20 is used for shielding the second region 104. The mask 20 is placed on top of the antireflective layer 174. Accordingly, the components in the second region 104 may be prevented from the curing light 10.

Figure 2C:
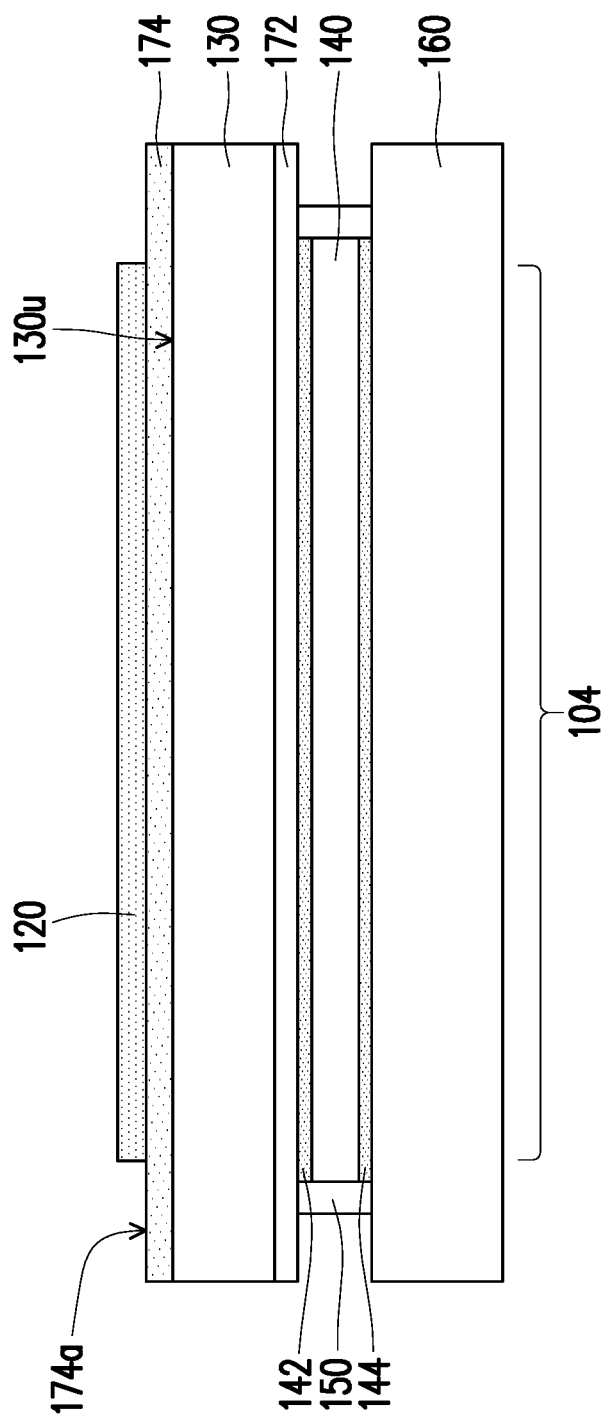

After the sealant 150 is cured, the mask 20 is removed and as shown in FIG. 2C, the light filtering layer 120 may be disposed with a patterned film deposition on the upper surface 174a of the anti-reflective layer 174. The pattern may be produced through auxiliary mask (not shown) disposed on the anti-reflective layer 174. The auxiliary mask may include an opening exposing a region that coincides with the second region 104. The light filtering layer 120 may be fabricated through sol-gel process, sputtering, or atomic layer deposition when the auxiliary mask exposing a region that coincides with the second region 104 is placed on the anti-reflective layer 174. Accordingly, in the present embodiment, the deposition pattern of the light filtering layer 120 may define the second region 104 of the display panel. Thereafter, an annealing step may further be performed to complete the formation of the light filtering layer 120. The annealing step may be performed at a temperature in the range from about 150° C. to about 400° C. for a time in the range from about 10 minutes to about 3 hours.

Figure 2D:
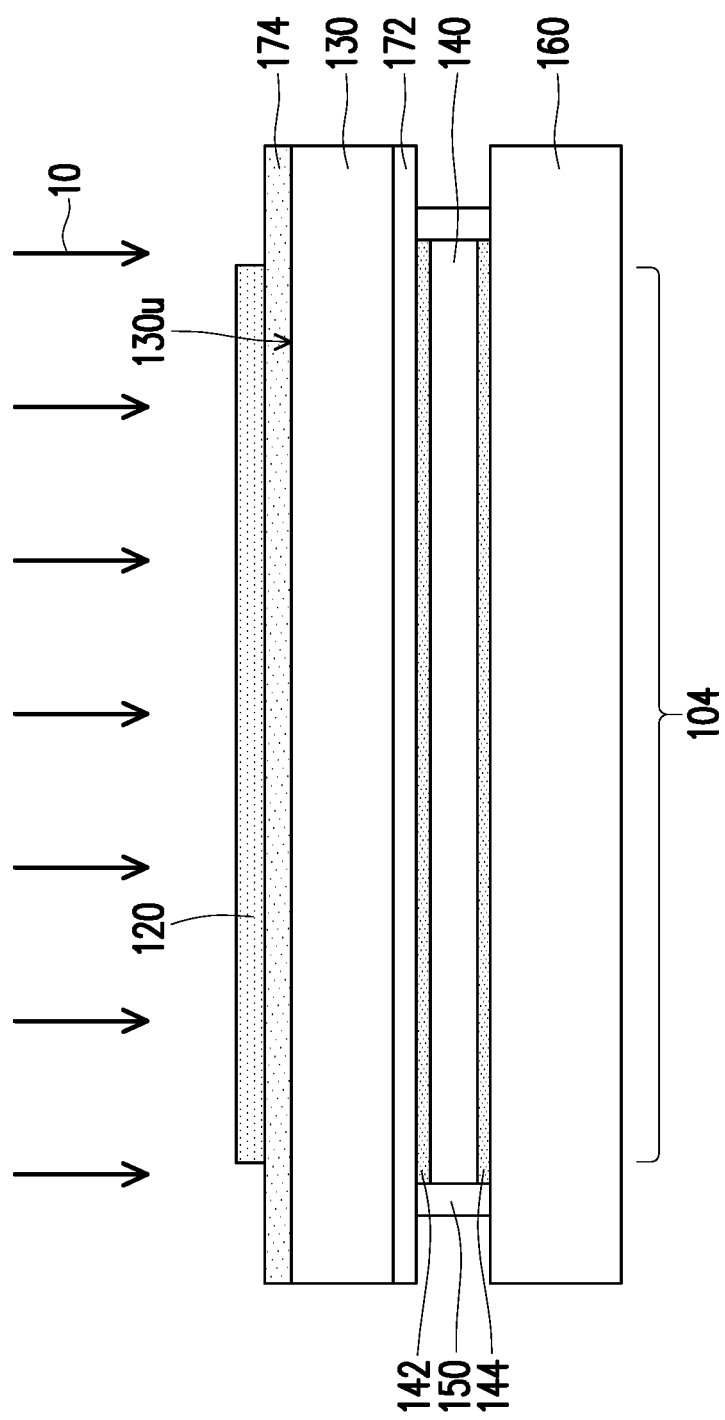

In some alternative embodiments, as shown in FIG. 2D, the light filtering layer 120 may be formed before the sealant 150 is cured. The process of forming the light filtering layer 120 may be similar to or substantially the same as those described for FIG. 2C. The light shielding layer 120 may serve as the mask shielding the curing light 10 in the second region 104 during the curing process. As the filtering property of the light filtering layer 120, the light filtering layer 120 may protect the two alignment layers 142 and 144 disposed within the second region 104.

Specifically, the light filtering layer 120 may absorb or dissipate the UV light, so that the intensity of transmitted UV light within the second region 104 where the light filtering layer 120 being formed is lower than the intensity of transmitted UV light outside the second region 104, e.g. the region where the sealant 150 is formed. Therefore, the light filtering layer 120 may protect the underlying components against photochemical damage, while the sealant 150 may be properly cured.

Figure 2E:
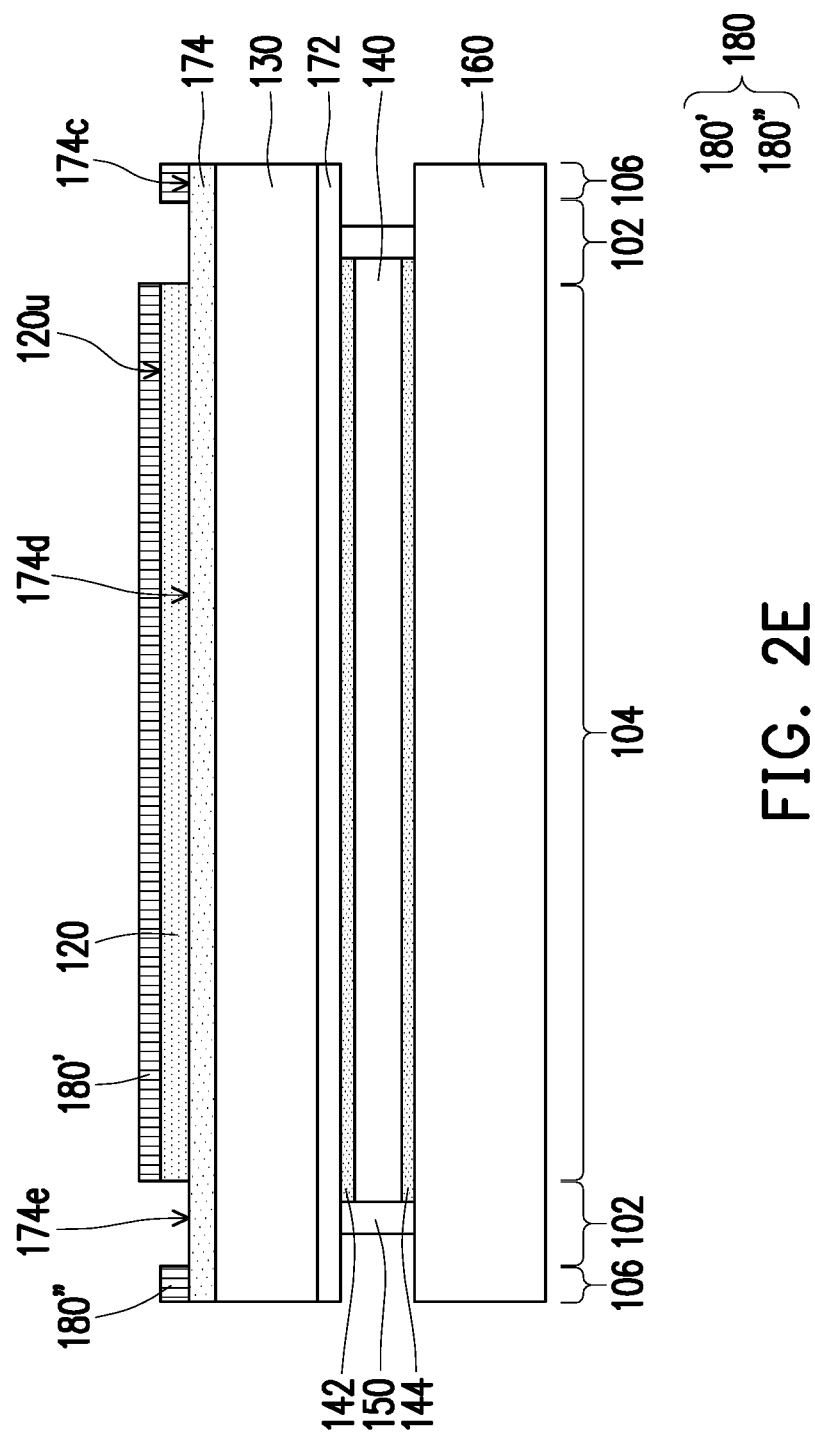

As shown in FIG. 2E, subsequent to the step of FIG. 2C or the step of FIG. 2D, the hydrophobic layer 180 may be formed on the upper surface 120u of the light filtering layer 120 in the second region 104 and on the upper surface 174a of the anti-reflective layer 174. Specifically, the upper surface 174a of the anti-reflective layer 174 as indicated in FIG. 2A may divide into three portions: the upper surface 174c in the peripheral region 106 is revealed by the light filtering layer 120 and is functionalised, the upper surface 174d in the second region 104 is covered by the light filtering layer 120, and the upper surface 174e in the first region 102 is revealed by the light filtering layer 120 without being functionalised. Therefore, the exposed upper surface 174e may be more hydrophilic than the adjacent functionalized upper surface 174c and the functionalized light filtering layer 120.

In the embodiment, the pattern of the hydrophobic layer 180 may be formed through the use of an auxiliary mask (not shown) that covers the first region 102 and exposes the second region 104 and the peripheral region 106 during the surface functionalization step. In an alternative embodiment, a blanket hydrophobic layer may be formed on the light filtering layer 120 and the anti-reflective layer 174 and subsequently patterned to form the pattern of the hydrophobic layer 180. The hydrophobic layer 180 thus has a portion 180' extending on the second region 104 in contact with the light filtering layer 120, and another portion 180" in the peripheral region 106 in contact with the anti-reflective layer 174 while the hydrophobic layer 180 does not exist in the first region 102.

Thereafter, the patterned light shielding layer 110 may be formed on the top substrate 130 in the first region 102 via a wet process such as ink-jet, super ink-jet, screen and APR printing technologies, or the like so that the display panel 200A as shown in FIG. 2A is formed. The material of the patterned light shielding layer 110 may include organic dye material, but the disclosure is not limited thereto. In the present embodiment, the upper surface 174c of the anti-reflective layer 174 in the peripheral region 106 of the display panel 200A and the upper surface 120u of the light filtering layer 120 in the second region 104 are more hydrophobic than the upper surface 174e in the first region 102. Therefore, the ink material may evenly spread over the first region 102 without spilling into the second region 104 or the peripheral region 106 during the printing process. Accordingly, the ink material may be evenly distributed and firmly restricted within the first region 102. Thereafter, a curing process may be performed to solidify the ink material to form the patterned light shielding layer 110. Particularly, the patterned light shielding layer 110 may present sharp edges with good linearity.

Figure 2F:
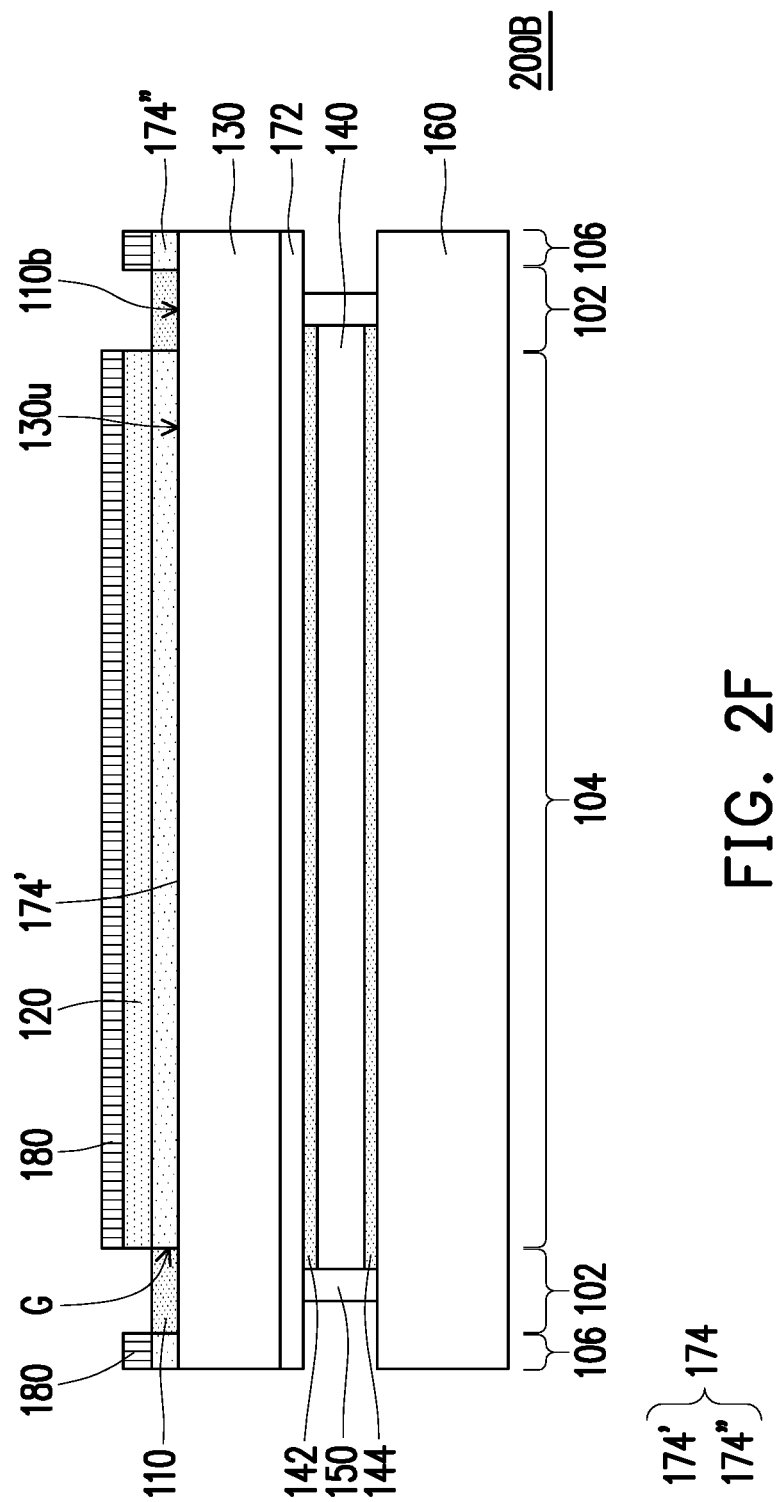
FIGS. 2F-2H show cross sections of a display panel according to some embodiments of the present disclosure.

In FIG. 2F is shown a cross section of a display panel 200B according to another embodiment of the present disclosure. The structure of the display panel 200B shown in FIG. 2F may be an implementing example of an embodiment of the present disclosure. The display panel 200B shown in FIG. 2F is similar to the display panel 200A shown in FIG. 2A and the same or similar reference numbers in the two embodiments represent the same or similar elements or components. The display panel 200B shown in FIG. 2F differs from the display panel 200A shown in FIG. 2A in that the patterned light shielding layer 110 of the display panel 200B is in contact with the upper surface 130u of the top substrate 130. An opening G exists in the anti-reflective layer 174 to reveal the top substrate 130 in the first region 102 of the display panel 200B and the patterned light shielding layer 110 is deposited on the top substrate 130 directly. The opening G may separate the anti-reflective layer 174 in two portions, one portion 174' over the second region 104, and the other portion 174" over the peripheral region 106. The two portions 174' and 174" may be coplanar. In other words, the anti-reflective layer 174 is blank in the first region 102 of the display panel 200B, and the bottom surface 110b of the patterned light shielding layer 110 physically contacts an upper surface 130u of the top substrate 130.

Figure 2G:
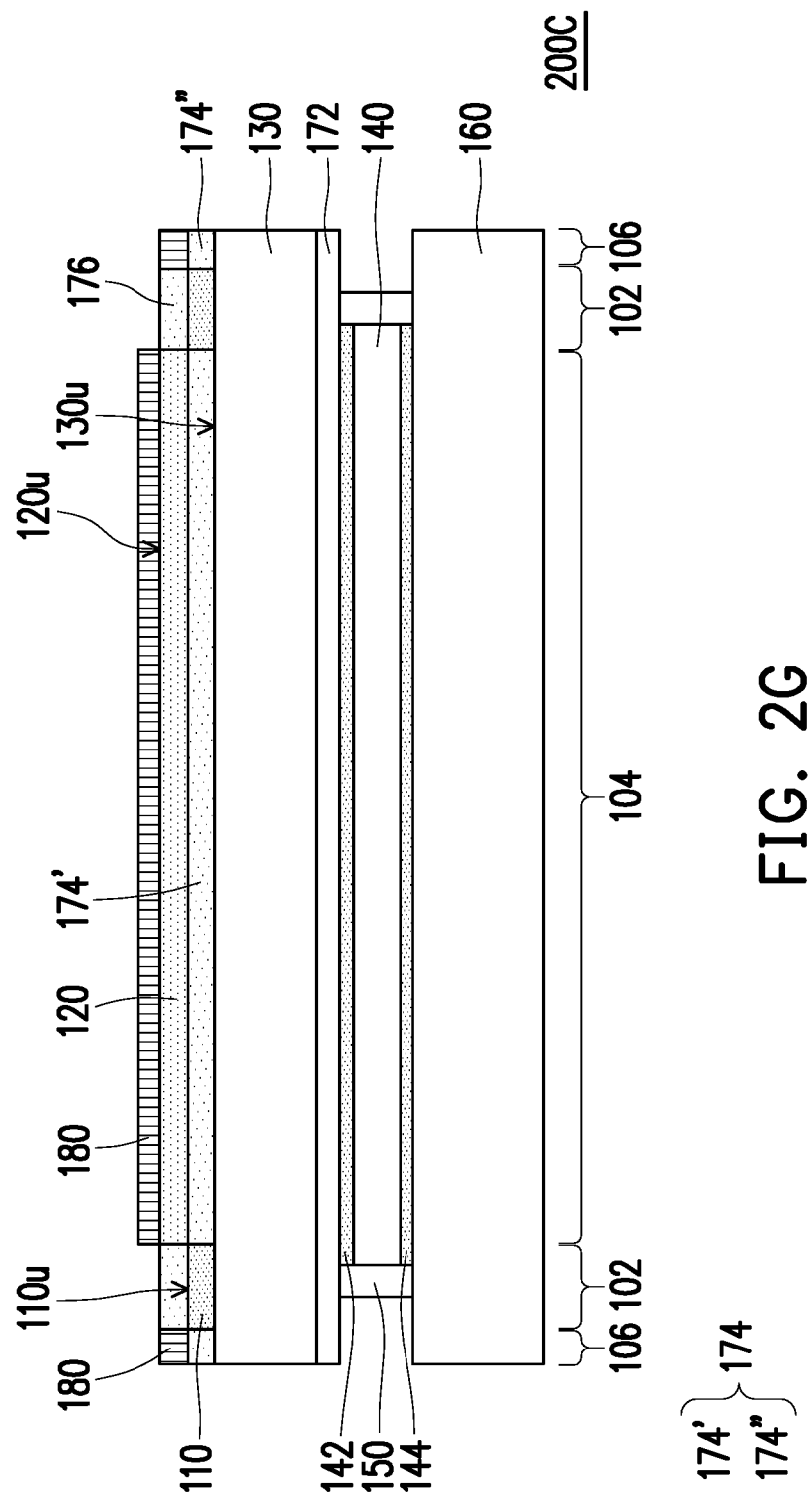

In FIG. 2G is shown a cross section of a display panel 200C according to another embodiment of the present disclosure. The display panel 200C shown in FIG. 2G is similar to the display panel 200B shown in FIG. 2F and the same or similar reference numbers in the two embodiments represent the same or similar elements or components. The display panel 200C shown in FIG. 2G differs from the display panel 200B shown in FIG. 2F in that the display panel 200C further includes an anti-reflective pattern 176 extending in the first region 102 on the patterned light shielding layer 110. The upper surface 110u of the patterned light shielding layer 110 is covered by the anti-reflective pattern 176. In the present embodiment, two portions 174' and 174" of the anti-reflective layer 174 are in contact with the upper surface 130u of the top substrate 130 in the second region 104 and the peripheral region 106, whilst in the first region 102, the patterned light shielding layer 110 is interposed between the anti-reflective pattern 176 and the top substrate 130. That is, in display panel 200C, the two portions 174' and 174" of the anti-reflective layer 174 may be coplanar, whilst the anti-reflective pattern 176 may not be coplanar with the anti-reflective layer 174.

Figure 2H:
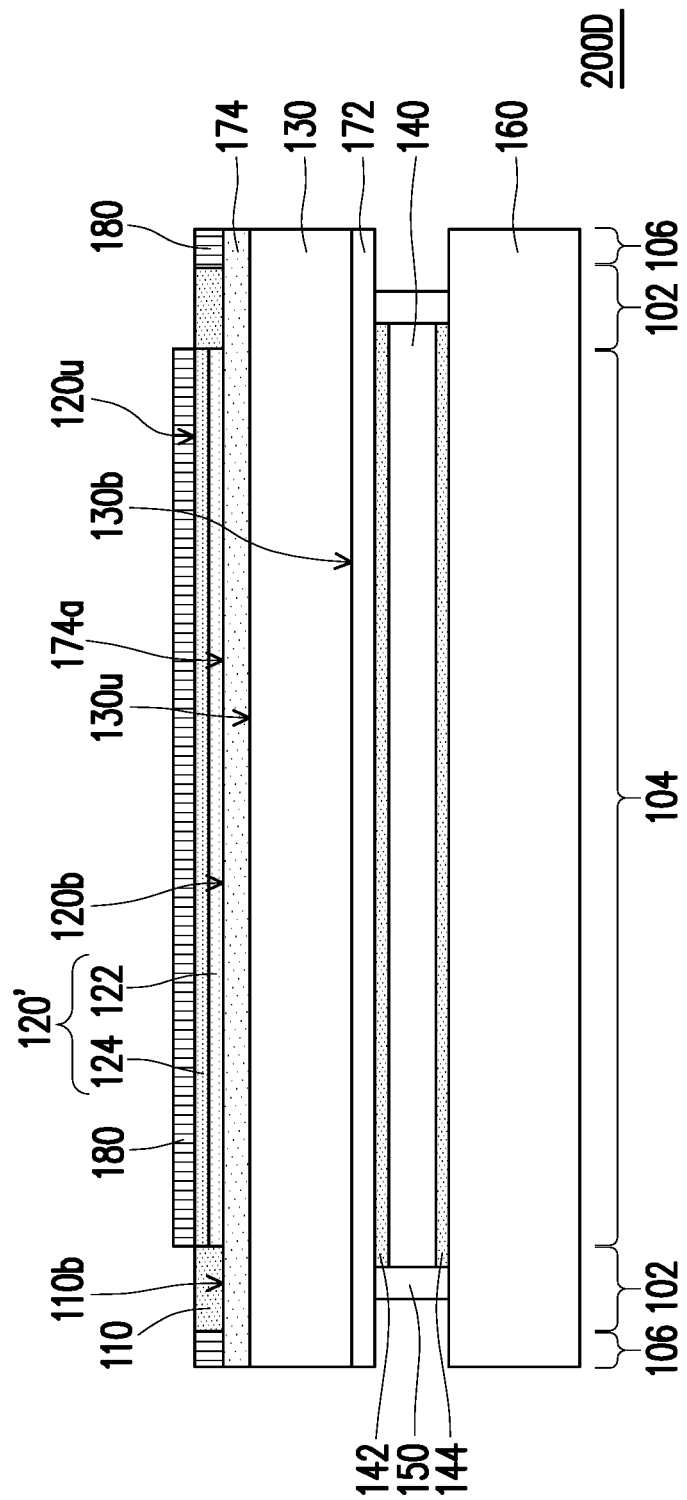

In FIG. 2H is shown a cross section of a display panel 200D according to another embodiment of the present disclosure. The structure of the display panel 200D shown in FIG. 2H may be an implementing example of an embodiment of the present disclosure. The display panel 200D shown in FIG. 2H is similar to the display panel 200A shown in FIG. 2A and the same or similar reference numbers in the two embodiments represent the same or similar elements or components. The display panel 200D shown in FIG. 2H differs from the display panel 200A shown in FIG. 2A in that the light filtering layer 120' of the display panel 200D is composed by a first film 122 and a second film 124 disposed on the first film 122. The first film 122 and the second film 124 may be made of different materials or have different compositions. For example, the first film 124 may contain zinc oxide, whilst the second film 124 may include cerium oxide. The first film 122 is sandwiched between the anti-reflective layer 174 and the second film 124. An upper surface 120u of the second film 124 may be functionalized, and a hydrophobic layer 180 is formed thereon, which is similar to the embodiment of FIG. 2A.

The display panels 200B, 200C, and 200D may be produced through similar steps as the ones previously described for display panel 200A and shown in FIGS. 2B-2E.

Figure 3A:
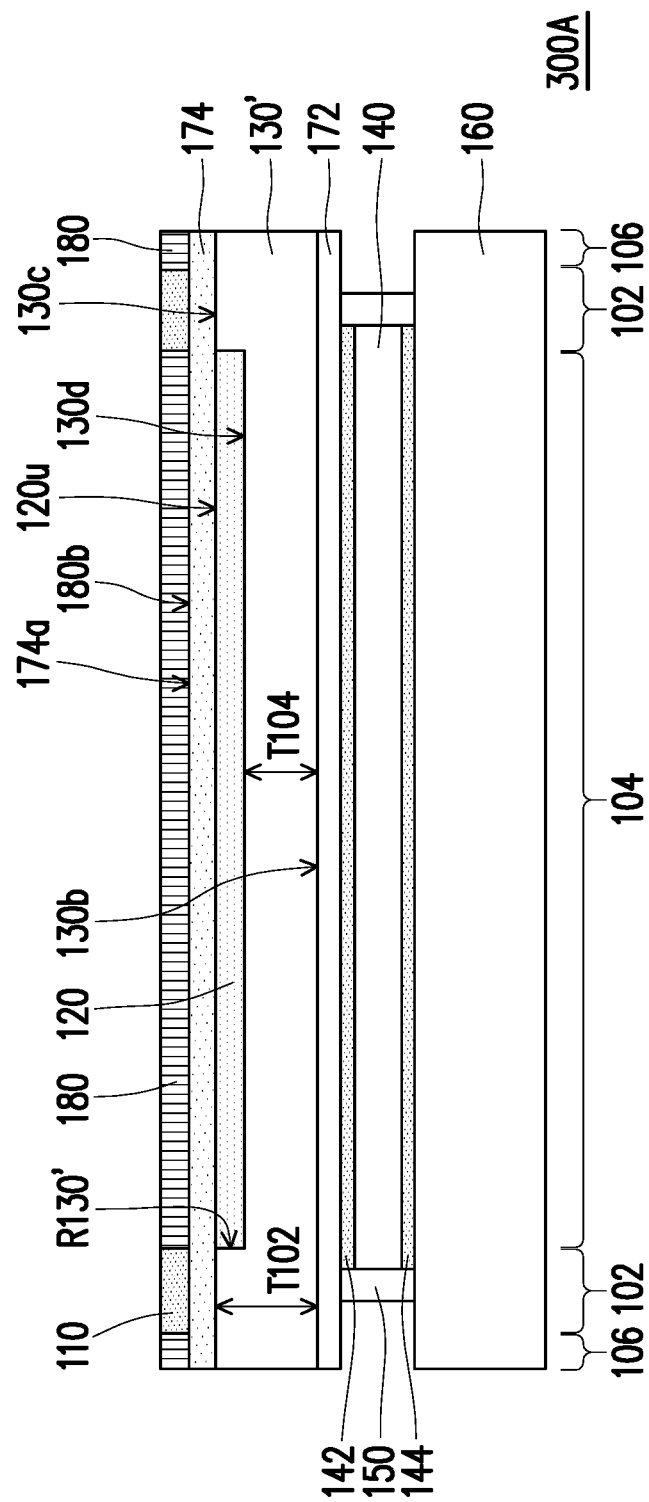
FIGS. 3A-3C show cross sections of a display panel according to some embodiments of the present disclosure.

In FIG. 3A is shown a cross section of a display panel 300A according to another embodiment of the present disclosure. The structure of the display panel 300A shown in FIG. 3A may be an implementing example of an embodiment of the present disclosure. The display panel 300A shown in FIG. 3A is similar to the display panel 200A shown in FIG. 2A and the same or similar reference numbers in the two embodiments represent the same or similar elements or components. The display panel 300A shown in FIG. 3A differs from the display panel 200A of FIG. 2A in that the top substrate 130' has a recess R130' that extends in the second region 104. A thickness T104 of the top substrate 130' in a second region 104 is smaller than a thickness T102 of the top substrate 130' in the first region 102 or the peripheral region 106. In other words, an upper surface 130c of the top substrate 130' in the first region 102 or the peripheral region 106 may be farther to the bottom surface 130b of the top substrate 130' than an upper surface 130d of the top substrate 130' in the second region 104.

In the present embodiment, the light filtering layer 120 may be disposed in the recess R130' and in contact with the upper surface 130d of the top substrate 130', and the anti-reflective layer 174 may be disposed on top of the light filtering layer 120 in the second region 104 of the display panel 300A. The anti-reflective layer 174 may be in contact with the upper surface 130c of the top substrate 130' in the first region 102 and the peripheral region 106, and in contact with the upper surface 120u of the light filtering layer 120 in the second region 104. Accordingly, the light filtering layer 120 is disposed in the recess R130' and sandwiched between the anti-reflective layer 174 and the top substrate 130'. Another difference from display panel 200A shown in FIG. 2A is that in display panel 300A, the hydrophobic layer 180 is formed on and in contact with the upper surface 174a of the anti-reflective layer 174 in the second region 104 and the peripheral region 106.

In the present embodiment, the recess R130' is generated by removing a portion of the top substrate 130' from the region designed to be the second region 104. The recess R130' may be generated by dry (for example, plasma) or wet (for example, with hydrofluoric acid) etching process. The etching process may be performed on the non-patterned top substrate with an auxiliary mask (not shown) or a patterned photoresist layer (not shown) thereon exposing the portion of the top substrate 130' that is going to be removed. After the etching step, the thickness T104 of the top substrate 130' in the second region 104 is smaller than the thickness T102 of the top substrate 130' outside the second region 104.

The thickness of the light filtering layer 120 may be similar or substantially identical to the depth of the recess R130', such that the upper surface 120u of the light filtering layer 120 may be coplanar with the upper surface 130c of the top substrate 130' in the first region 102. The formation of the light filtering layer 120 may be performed similarly to what described above in FIG. 2C, and a description thereof will be omitted herein. In the present embodiment, an annealing step may also be included to form the light filtering layer 120.

After the formation of the light filtering layer 120, the blanket anti-reflective layer 174 is shown to be formed on the top substrate 130'. The anti-reflective layer 174 may be in contact with the upper surface 130c of the top substrate 130' outside of the second region 104, whilst it may in contact with the upper surface 120u of the light filtering layer 120 in the second region 104. Therefore, in the present embodiment the light filtering layer 120 is embedded within the top substrate 130' and encased by the anti-reflective layer 174 and the top substrate 130'.

In the present embodiment, the top substrate 130' and the bottom substrate 160 may be assembled via the sealant 150 after the formation of the light filtering layer 120 whilst the display panel 300A may further include the alignment layer 142 and the alignment layer 144 formed respectively between the display medium layer 140 and the top substrate 130' and between the display medium layer 140 and the bottom substrate 160. The sealant 150 may be a UV-curable sealant. As the filtering property of the light filtering layer 120, the light filtering layer 120 may protect the two alignment layers 142 and 144 from the UV irradiation during curing the sealant 150. Therefore, the damage of the two alignment layers 142 and 144 caused by UV light irradiation may be mitigated or prevented.

Once the sealant 150 is cured, the hydrophobic layer 180 may be formed in the second 104 and in the peripheral region 106. According to the present embodiment, the hydrophobic layer 180 may be blank and/or absent in a predetermined region that defines the first region 102. Thereafter, the patterned light shielding layer 110 is formed on the anti-reflective layer 174 in the first region 102 through printing process such as an inkjet printing process, so that the structure shown in FIG. 3A is obtained. Owing that the hydrophobic layer 180 is absent in the first region 102, the patterned light shielding layer 110 may be formed with a sharp pattern and good edge linearity.

Figure 3B:
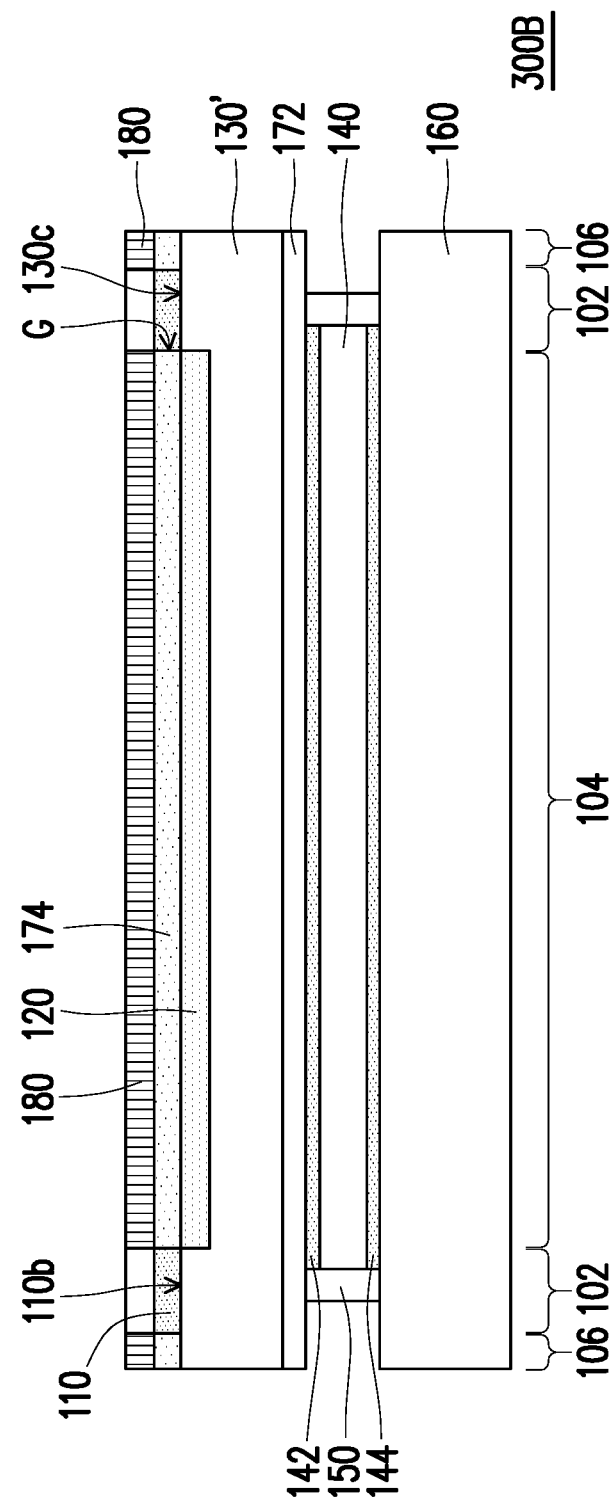

In FIG. 3B is shown a cross section of a display panel 300B according to another embodiment of the present disclosure. The structure of the display panel 300B shown in FIG. 3B may be an implementing example of an embodiment of the present disclosure. The display panel 300B shown in FIG. 3B is similar to the display panel 300A shown in FIG. 3A and the same or similar reference numbers in the two embodiments represent the same or similar elements or components. The display panel 300B shown in FIG. 3B differs from the display panel 300A of FIG. 3A in that in display panel 300B, the patterned light shielding layer 110 is in contact with the upper surface 130c of the top substrate 130'. Specifically, an opening G exists in the anti-reflective layer 174 to reveal the top substrate 130' in the first region 102 where the patterned light shielding layer 110 is deposited. In other words, the anti-reflective layer 174 is absent in the first region 102 of the display panel 300B, and the bottom surface 110b of the patterned light shielding layer 110 physically contacts the upper surface 130c of the top substrate 130' in the first region 102. According to an embodiment of the present disclosure, the display panel 300B may be manufactured following similar steps than the ones described for display panel 300A.

Figure 3C:
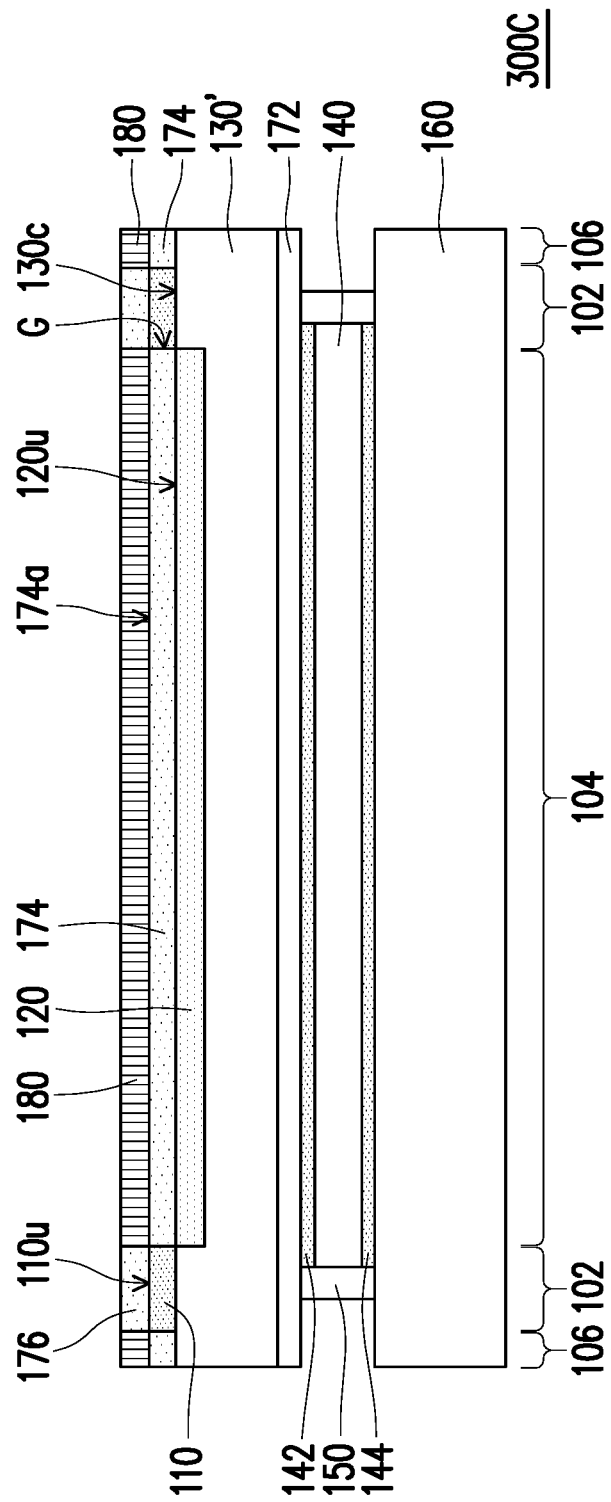

In FIG. 3C is shown a cross section of a display panel 300C according to another embodiment of the present disclosure. The structure of the display panel 300C shown in FIG. 3C may be an implementing example of an embodiment of the present disclosure. The display panel 300C shown in FIG. 3C is similar to the display panel 300B shown in FIG. 3B and the same or similar reference numbers in the two embodiments represent the same or similar elements or components. The display panel 300C shown in FIG. 3C differs from the display panel 300B of FIG. 3B in that in display panel 300C, an anti-reflective pattern 176 is further disposed on the upper surface 110u of the patterned light shielding layer 110. A material of the antireflective layer 174 may be the same as or different from a material of the anti-reflective pattern 176.

The formation of the anti-reflective layer 174 may be performed prior to the formation of the patterned light shielding layer 110 followed by the formation of the anti-reflective pattern 176. The anti-reflective pattern 174 may be formed on the top substrate 130' to have an opening G exposing the top substrate 130' in the first region 102. Before the formation of the patterned light shielding layer 110, the upper surface 174a of the anti-reflective pattern 174 may be modified to form a hydrophobic layer 180 thereon and the hydrophobic layer 180 is absent in the first region 102. Accordingly, the patterned light shielding layer 110 may be formed in the first region 102 with a sharp pattern and good edge linearity. The anti-reflective pattern 176 may be subsequently formed on the patterned light shielding layer 110. In some alternative embodiments, the anti-reflective layer 174 and the anti-reflective pattern 176 may be formed simultaneously after the formation of the patterned light shielding layer 110. In the embodiment, the anti-reflective pattern 176 may not subject to the surface hydrophobic treatment so that no hydrophobic layer is formed on the anti-reflective pattern 176. In some alternative embodiments, the surface hydrophobic treatment may be performed after the formation of the anti-reflective pattern 176. Alternatively, the hydrophobic layer 180 on top of the anti-reflective layer 174 may be selectively removed after the formation of the patterned light shielding layer 110.

Figure 4A:
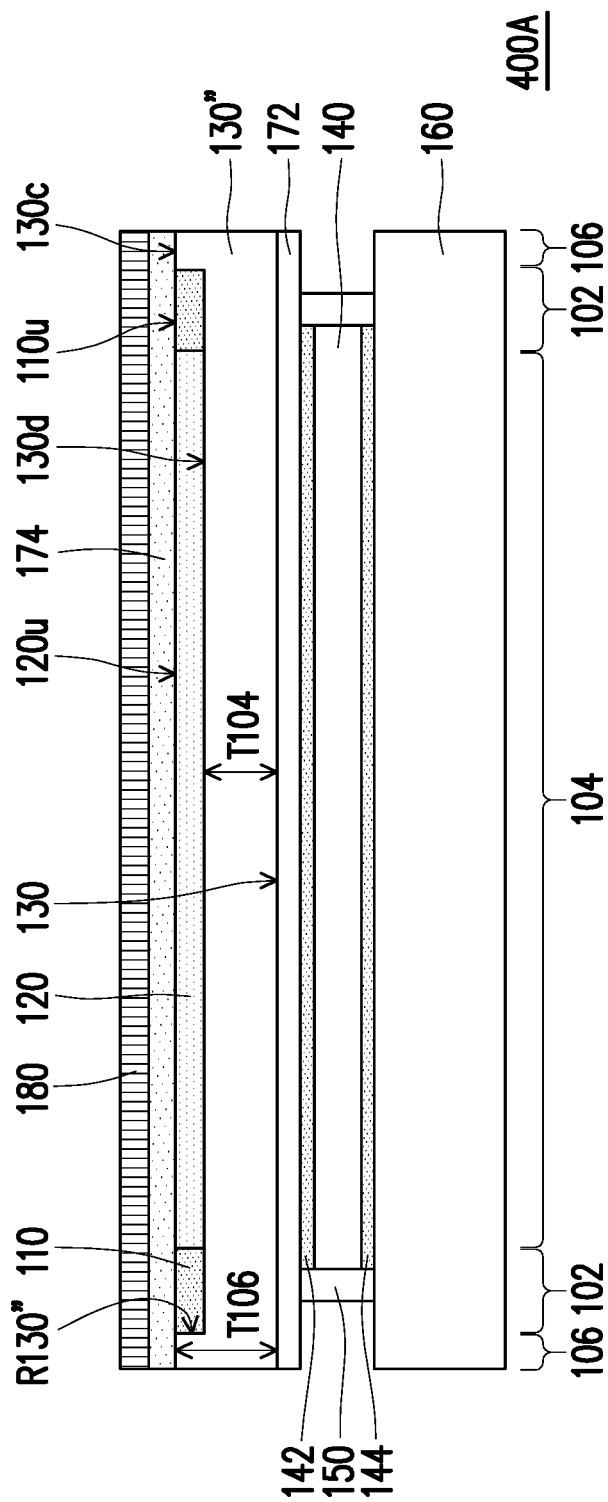
FIGS. 4A-4D show cross sections of a display panel according to some embodiments of the present disclosure.

In FIG. 4A is shown a cross section of a display panel 400A according to another embodiment of the present disclosure. The structure of the display panel 400A shown in FIG. 4A may be an implementing example of an embodiment of the present disclosure. The display panel 400A shown in FIG. 4A is similar to the display panel 300A shown in FIG. 3A and the same or similar reference numbers in the two embodiments represent the same or similar elements or components. The display panel 400A shown in FIG. 4A differs from the display panel 300A of FIG. 3A in that a recess R130" of the top substrate 130" extends in the first region 102 and in the second region 104. A thickness T104 of the top substrate 130" in the first region 102 and the second region 104 is smaller than a thickness T106 of the top substrate 130" in a peripheral region 106.

In the present embodiment, the patterned light shielding layer 110 is disposed in the recess R130" together with the light filtering layer 120, and the patterned light shielding layer 110 and the light filtering layer 120 both are in contact with the upper surface 130d of the top substrate 130" and are covered by the anti-reflective layer 174. In other words, the anti-reflective layer 174 may be in contact with the upper surface 130c of the top substrate 130" in the peripheral region 106, an upper surface 120u of the light filtering layer 120 in the second region 104, and an upper surface 110u of the patterned light shielding layer 110 in the first region 102. Furthermore, in display panel 400A, the anti-reflective layer 174 may be a blanket layer continuously extending in the first region 102, the second region 104 and the peripheral region 106, and the hydrophobic layer 180 may be selectively disposed on the anti-reflective layer 174 and continuous extend over the first region 102, the second region 104 and the peripheral region 106 of the display panel 400A.

Figure 4B:
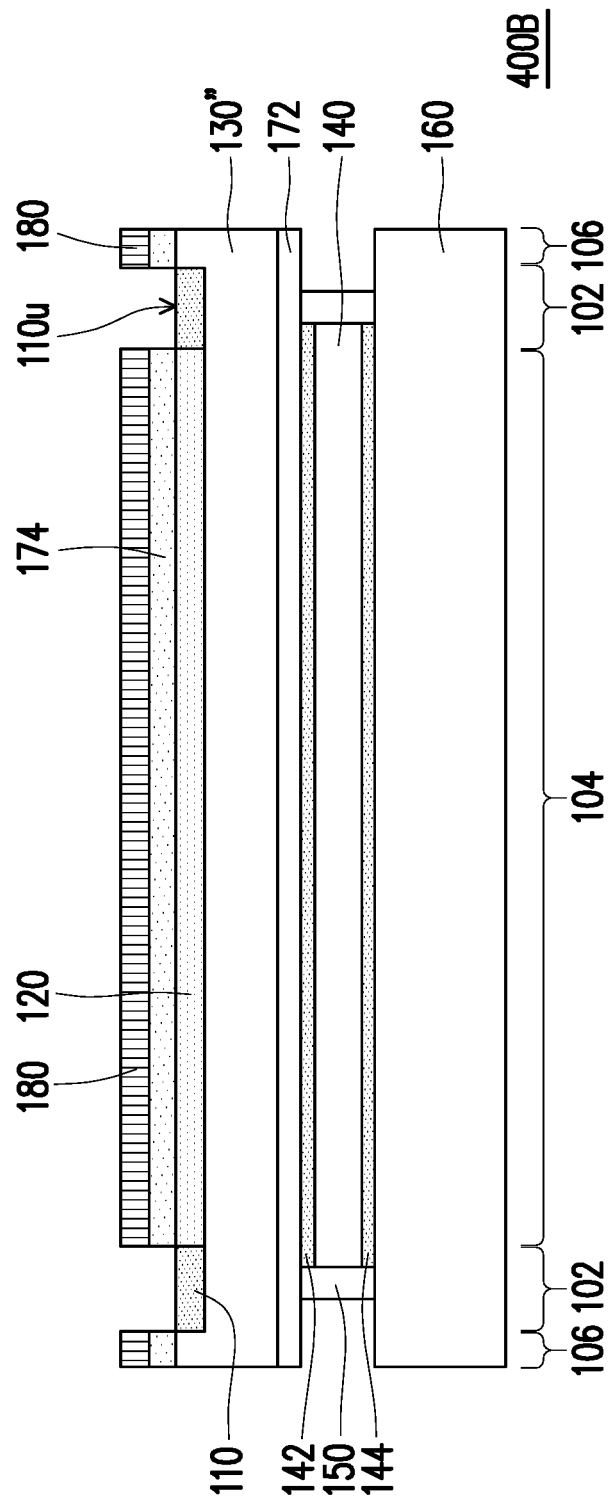

In FIG. 4B is shown a cross section of a display panel 400B according to another embodiment of the present disclosure. The structure of the display panel 400B shown in FIG. 4B may be an implementing example of an embodiment of the present disclosure. The display panel 400B shown in FIG. 4B is similar to the display panel 400A shown in FIG. 4A and the same or similar reference numbers in the two embodiments represent the same or similar elements or components. The display panel 400B shown in FIG. 4B differs from the display panel 400A shown in FIG. 4A in that the anti-reflective layer 174 and the hydrophobic layer 180 are absent in first region 102 of the display panel 400B. Therefore, the upper surface 110u of the patterned light shielding layer 110 is exposed in the first region 102 of the display panel 400B.

Figure 4C:
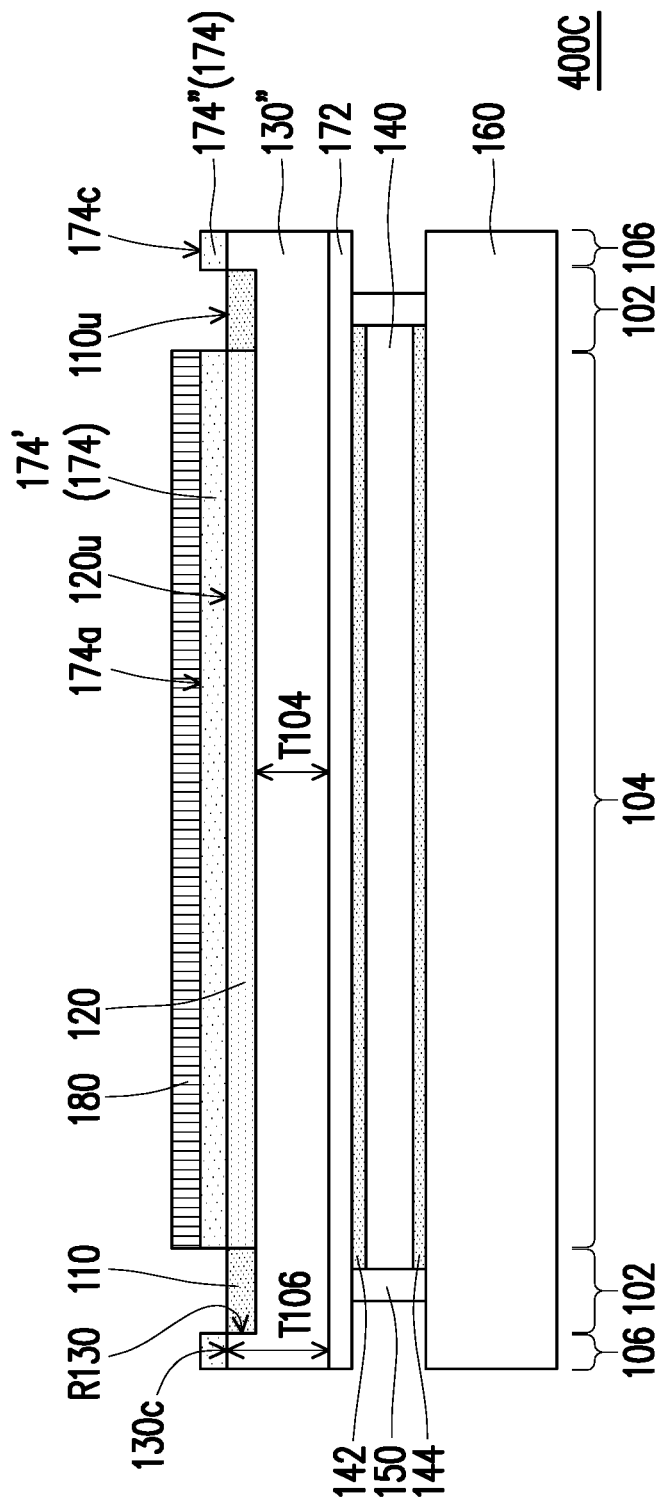

In FIG. 4C is shown a cross section of a display panel 400C according to another embodiment of the present disclosure. The structure of the display panel 400C shown in FIG. 4C may be an implementing example of an embodiment of the present disclosure. The display panel 400C shown in FIG. 4C is similar to the display panel 400B shown in FIG. 4B and the same or similar reference numbers in the two embodiments represent the same or similar elements or components. The display panel 400C shown in FIG. 4C differs from the display panel 400B of FIG. 4B in that the hydrophobic layer 180 is further absent in the peripheral region 106. That is, in the display panel 400C, the upper surface 174c of a portion 174" of the anti-reflective layer 174 is not covered by the hydrophobic layer 180.

Figure 4D:
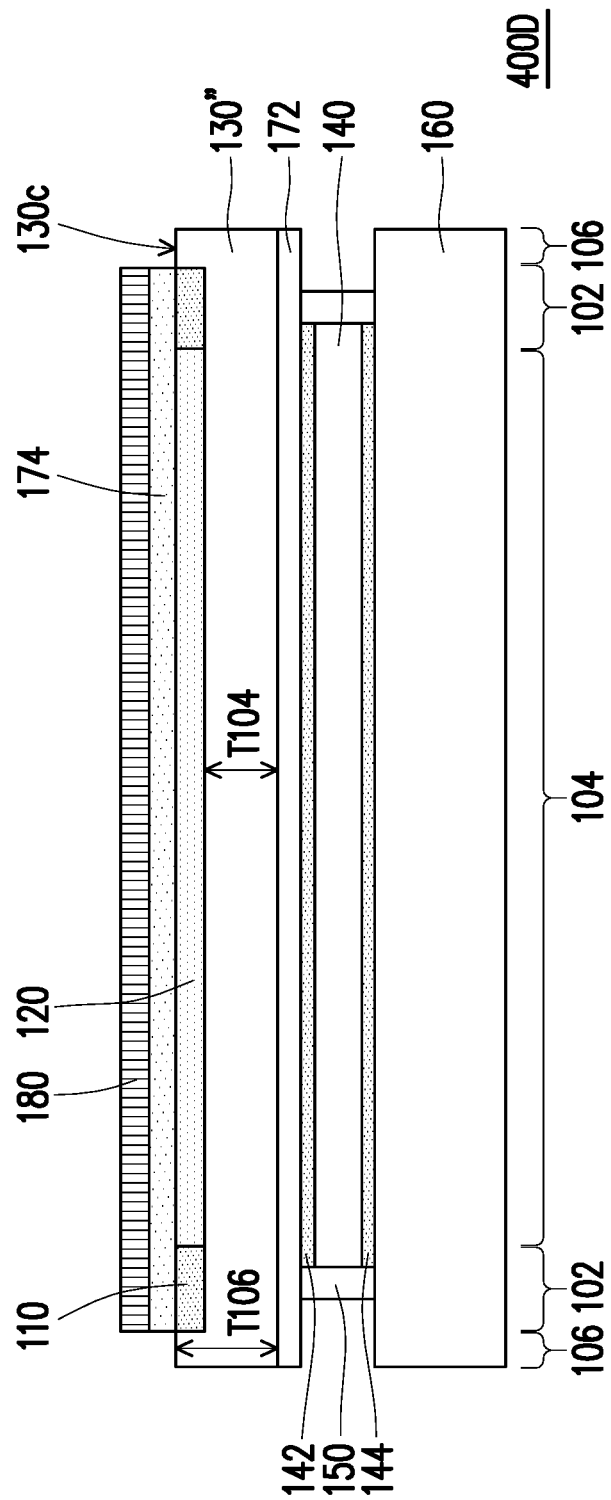

In FIG. 4D is shown a cross section of a display panel 400D according to another embodiment of the present disclosure. The structure of the display panel 400D shown in FIG. 4D may be an implementing example of an embodiment of the present disclosure. The display panel 400D shown in FIG. 4D is similar to the display panel 400A shown in FIG. 4A and the same or similar reference numbers in the two embodiments represent the same or similar elements or components. The display panel 400D shown in FIG. 4D differs from the display panel 400A of FIG. 4A in that the anti-reflective layer 174 and the hydrophobic layer 180 are absent in the peripheral region 106. In other words, the upper surface 130c of the top substrate 130" is exposed in the peripheral region 106 of the display panel 400D.

Figure 5A:
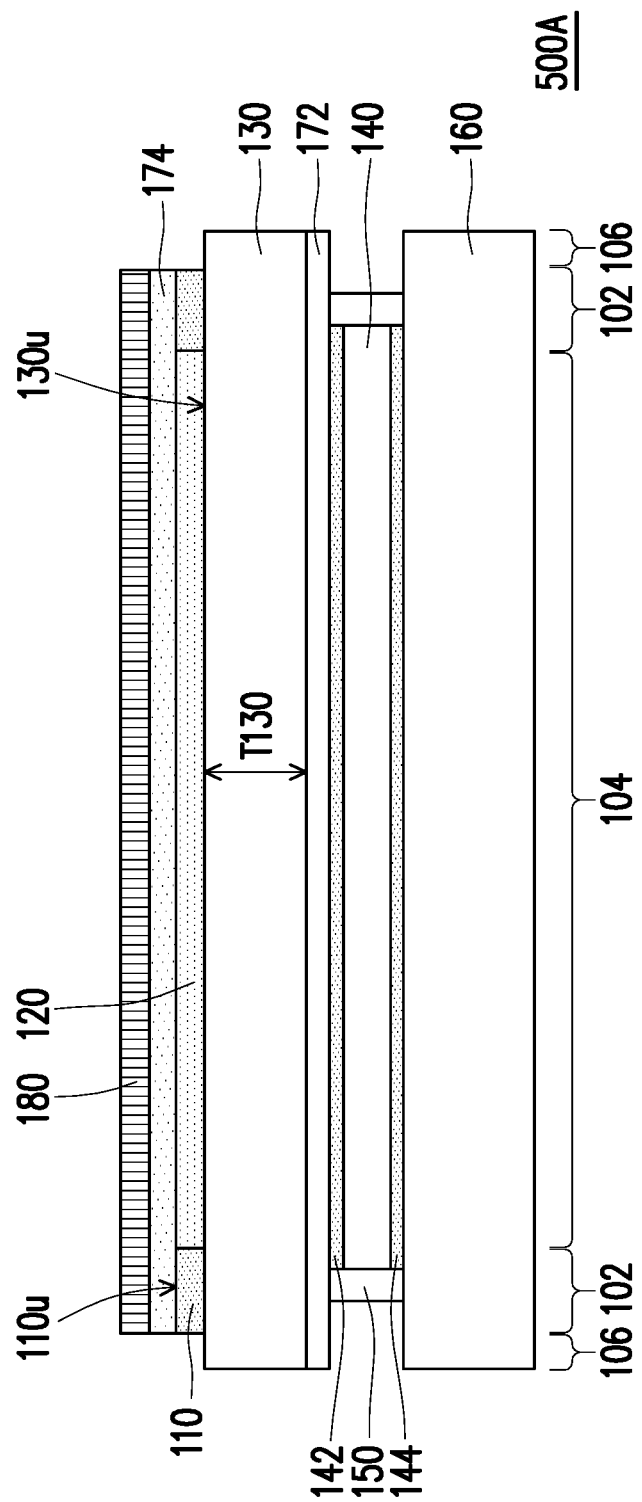
FIGS. 5A-5C show cross sections of a display panel according to some embodiments of the present disclosure.

In FIG. 5A is shown a cross section of a display panel 500A according to another embodiment of the present disclosure. The structure of the display panel 500A shown in FIG. 5A may be an implementing example of an embodiment of the present disclosure. The display panel 500A shown in FIG. 5A is similar to the display panel 400D shown in FIG. 4D and the same or similar reference numbers in the two embodiments represent the same or similar elements or components. The display panel 500A shown in FIG. 5A differs from the display panel 400D of FIG. 4D in that a top substrate 130 does not present any recess. In display panel 500A, the upper surface 130u of the top substrate 130 is flat and extends continuously over the first region 102, the second region 104, and the peripheral region 106 of the display panel 500A. In other words, a thickness T130 of the top substrate 130 is equal in the first region 102, the second region 104, and the peripheral region 106 of the display panel 500A. Therefore, the patterned light shielding layer 110 and the light filtering layer 120 are not encased within the top substrate 130.

Figure 5B:
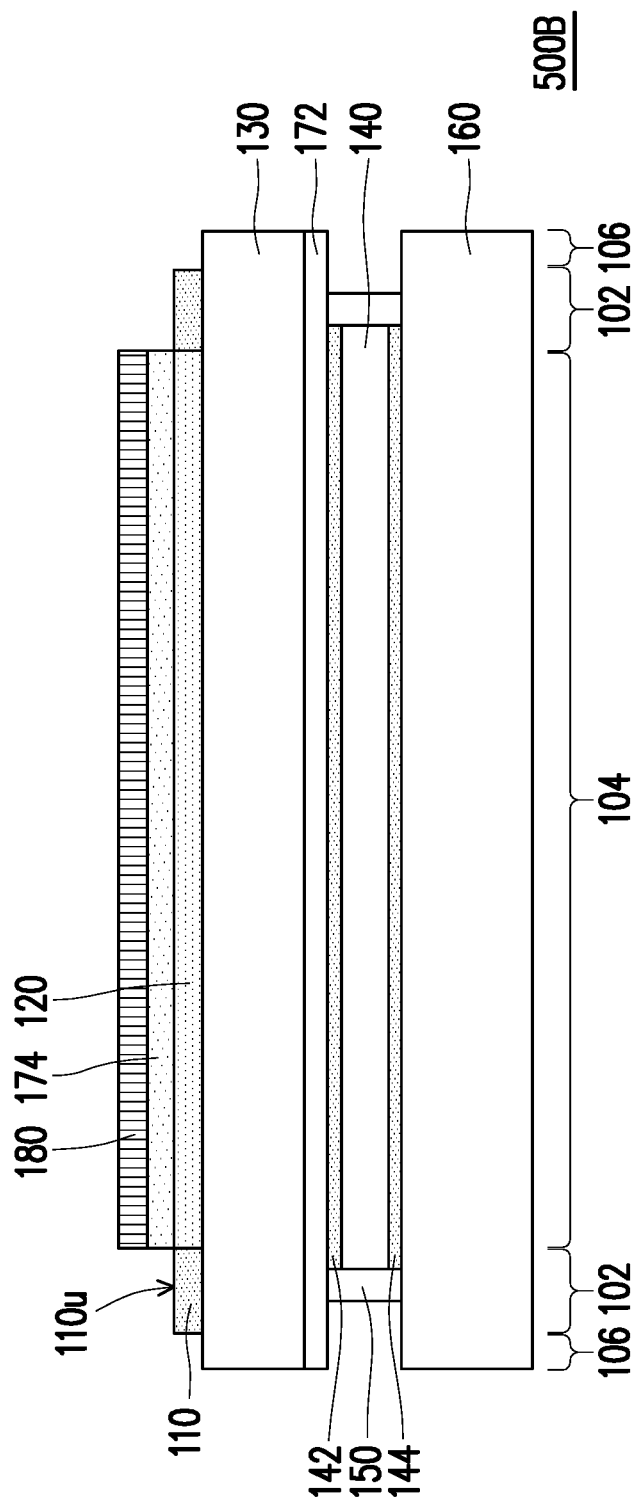

In FIG. 5B is shown a cross section of a display panel 500B according to another embodiment of the present disclosure. The structure of the display panel 500B shown in FIG. 5B may be an implementing example of an embodiment of the present disclosure. The display panel 500B shown in FIG. 5B is similar to the display panel 500A shown in FIG. 5A and the same or similar reference numbers in the two embodiments represent the same or similar elements or components. The display panel 500B shown in FIG. 5B differs from the display panel 500A of FIG. 5A in that the anti-reflective layer 174 and the hydrophobic layer 180 do not extend over the first region 102 of the display panel 500B. In other words, the upper surface 110u of the patterned light shielding layer 110 is not exposed by the anti-reflective layer 174 and the hydrophobic layer 180.

Figure 5C:
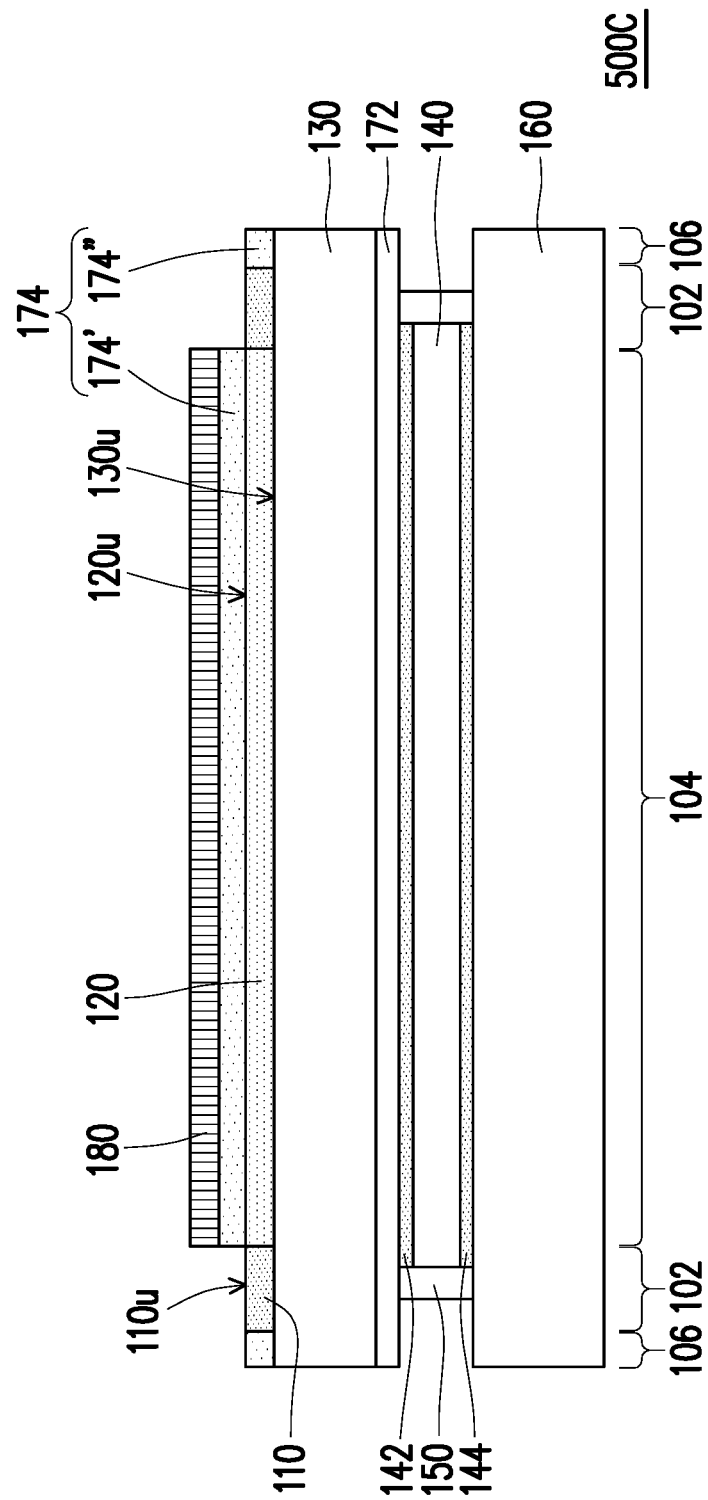

In FIG. 5C is shown a cross section of a display panel 500C according to another embodiment of the present disclosure. The structure of the display panel 500C shown in FIG. 5C may be an implementing example of an embodiment of the present disclosure. The display panel 500C shown in FIG. 5C is similar to the display panel 500B shown in FIG. 5B and the same or similar reference numbers in the two embodiments represent the same or similar elements or components. The display panel 500C differs from the display panel 500B in that a portion 174" of the anti-reflective layer 174 extends on the peripheral region 106. The portion 174" of the anti-reflective layer 174 is in contact with the upper surface 130u of the top substrate 130. In other words, in display panel 500C, the upper surface 130u of top substrate 130 are entirely covered by the overlaying layers. In display panel 500C, the portions 174' and 174" of the anti-reflective layer 174 may not be coplanar. In display panel 500C, the portion 174" of the anti-reflective layer 174, a patterned light shielding layer 110 and a light filtering layer 120 may all be in contact with the upper surface 130u of the top substrate 130, and be coplanar. In the present embodiment, the hydrophobic layer 180 may not extend to the portion 174" of the anti-reflective layer 174, but in some alternative embodiments, the hydrophobic layer 180 may further extend on the portion 174" of the anti-reflective layer 174. Alternatively, the hydrophobic layer 180 may be removed in some further embodiments.

Figure 6A:
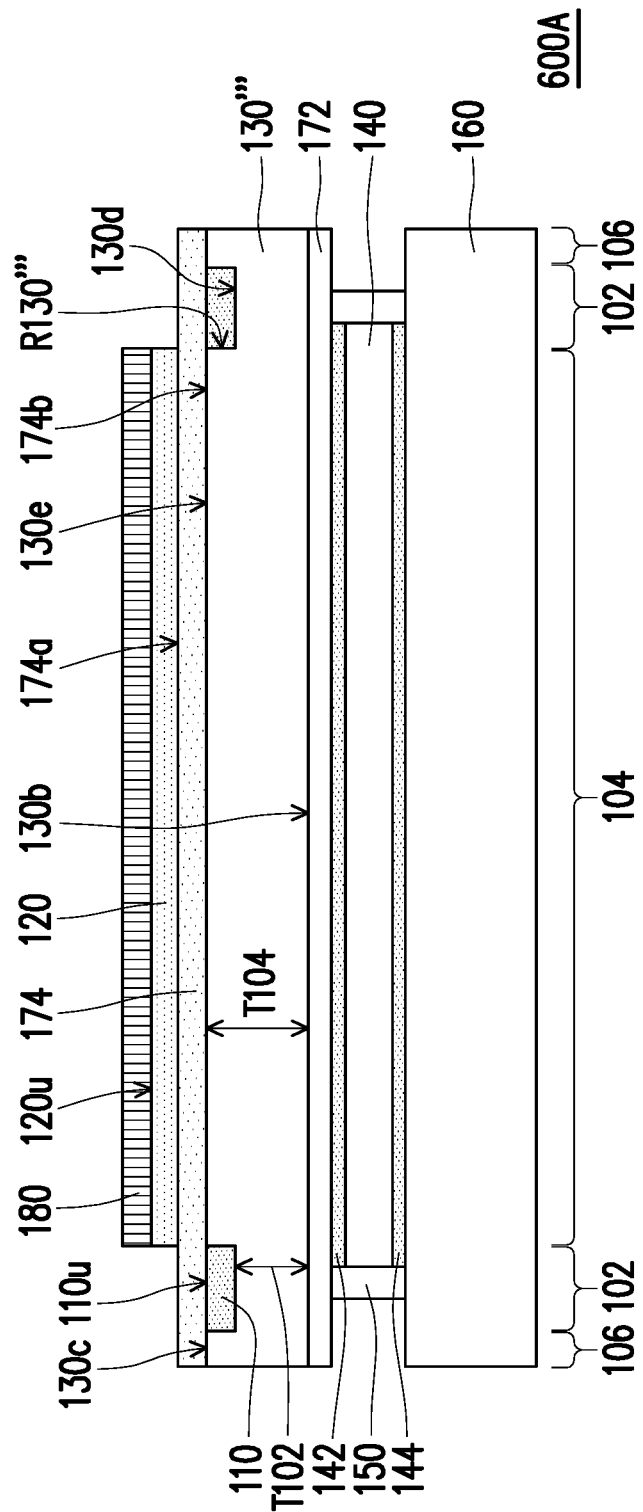
FIGS. 6A-6C show cross sections of a display panel according to some embodiments of the present disclosure.

In FIG. 6A is shown a cross section of a display panel 600A according to another embodiment of the present disclosure. The structure of the display panel 600A shown in FIG. 6A may be an implementing example of an embodiment of the present disclosure. The display panel 600A shown in FIG. 6A is similar to the display panel 200A shown in FIG. 2A and the same or similar reference numbers in the two embodiments represent the same or similar elements or components. The display panel 600A differs from the display panel 200A in that the top substrate 130''' has a recess R130''' extending within the first region 102 of the display panel 600A. A thickness T104 of the top substrate 130''' in the second region 104 is greater than a thickness T102 of the top substrate 130''' in the first region 102. The upper surface 130c of the top substrate 130''' in the peripheral region 106 is coplanar with the upper surface 130e of the top substrate 130''' in the second region 104, but the two upper surfaces 130c and 130e are not coplanar with the upper surface 130d of the top substrate 130''' in the first region 102 where the recess R130''' is located. That is, the upper surface 130d is closer to the bottom surface 130b of the top substrate 130''' than the two upper surfaces 130c and 130e.

In display panel 600A, the patterned light shielding layer 110 is disposed within the recess R130''' of the top substrate 130''', whilst the anti-reflective layer 174 is disposed on the two upper surfaces 130c and 130e of the top substrate 130''' and the upper surface 110u of the patterned light shielding layer 110. In addition, the light filtering layer 120 is disposed on the anti-reflective layer 174. The anti-reflective layer 174 extends continuously in the first region 102, in the second region 104, and in the peripheral region 106 of the display panel 600A.

The light filtering layer 120 is disposed on the upper surface 174a of the anti-reflective layer 174 in the second region 102 of the display panel 700A. Stated alternatively, the anti-reflective layer 174 is interposed between the light filtering layer 120 and the top substrate 130''' in the second region 104. The upper surface 120u of the light filtering layer 120 may be modified, and the hydrophobic layer 180 is formed thereon. In display panel 600A, the hydrophobic layer 180 may be formed only on the upper surface 120u of the light filtering layer 120, that is, the upper surface 174a of the anti-reflective layer 174 outside the second region 104 does not present a hydrophobic modification.

Figure 6B:
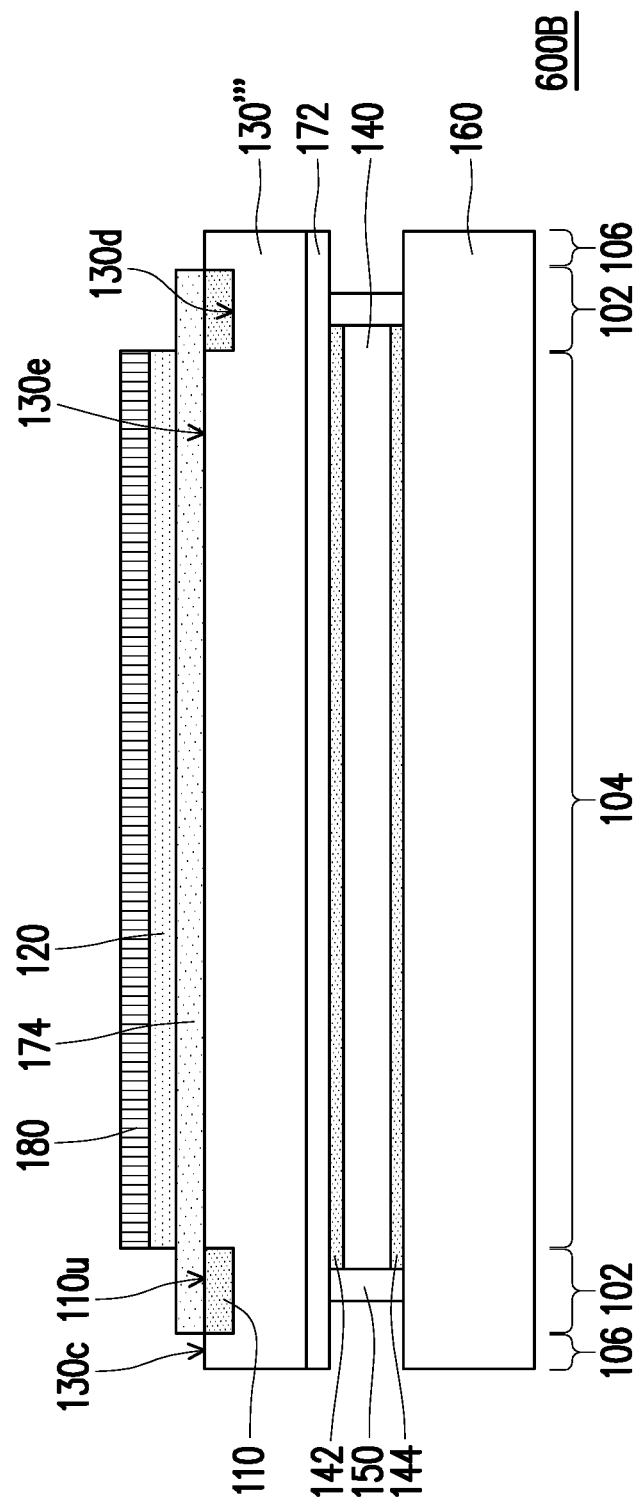

In FIG. 6B is shown a cross section of a display panel 600B according to another embodiment of the present disclosure. The structure of the display panel 600B shown in FIG. 6B may be an implementing example of an embodiment of the present disclosure. The display panel 600B shown in FIG. 6B is similar to the display panel 600A shown in FIG. 6A and the same or similar reference numbers in the two embodiments represent the same or similar elements or components. The display panel 600B differs from the display panel 600A in that the anti-reflective layer 174 does not extend on the peripheral region 106. Therefore, in display panel 600B, the upper surface 130c of the top substrate 130''' in the peripheral region 106 is exposed.

Figure 6C:
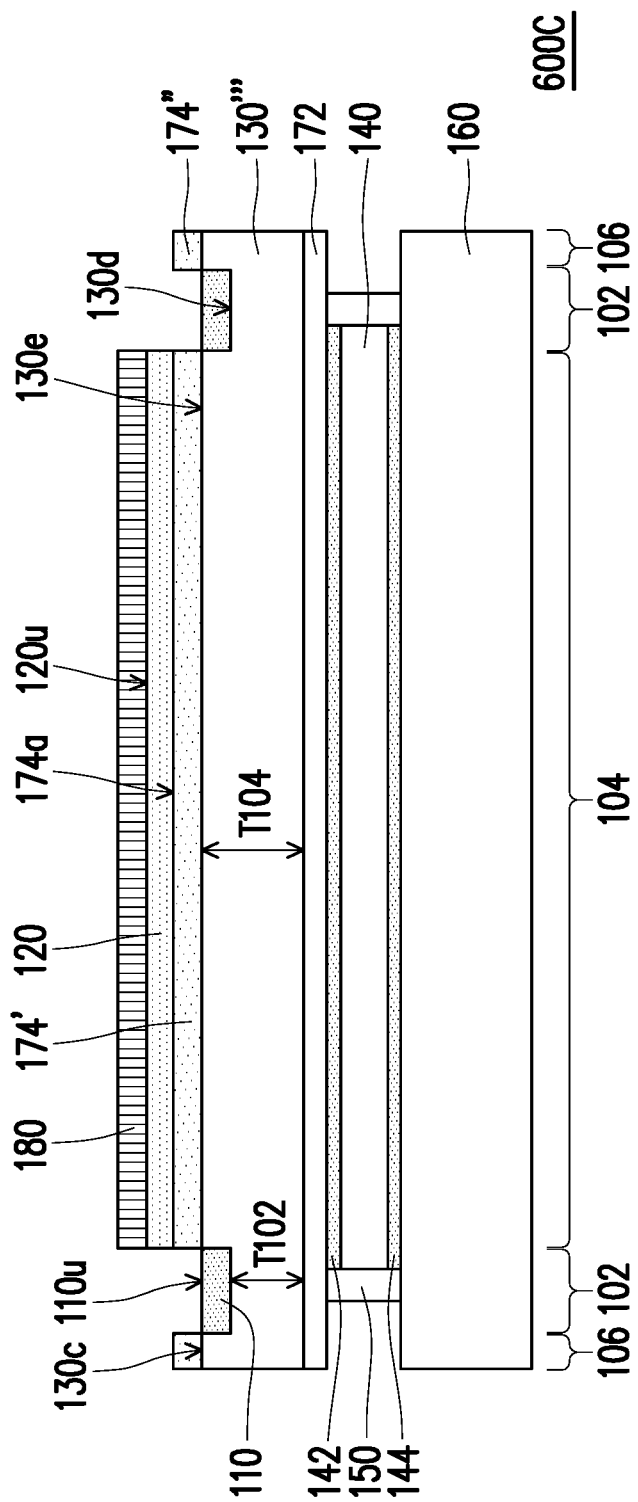

In FIG. 6C is shown a cross section of a display panel 600C according to another embodiment of the present disclosure. The structure of the display panel 600C shown in FIG. 6C may be an implementing example of an embodiment of the present disclosure. The display panel 600C shown in FIG. 6C is similar to the display panel 600B shown in FIG. 6B and the same or similar reference numbers in the two embodiments represent the same or similar elements or components. The display panel 600C differs from the display panel 600B in that the anti-reflective layer 174 is blank in the first region 102 of the display panel 700C, whilst a portion 174" of the anti-reflective layer 174 extends on the peripheral region 106. The portion 174" of the anti-reflective layer 174 is in contact with the upper surface 130c of the top substrate 130'''. In display panel 600C, the two portions 174' and 174" of the anti-reflective layer 174 may be coplanar and in contact with two upper surfaces, 130c and 130e, respectively, of the top substrate 130'41 .

Figure 7A:
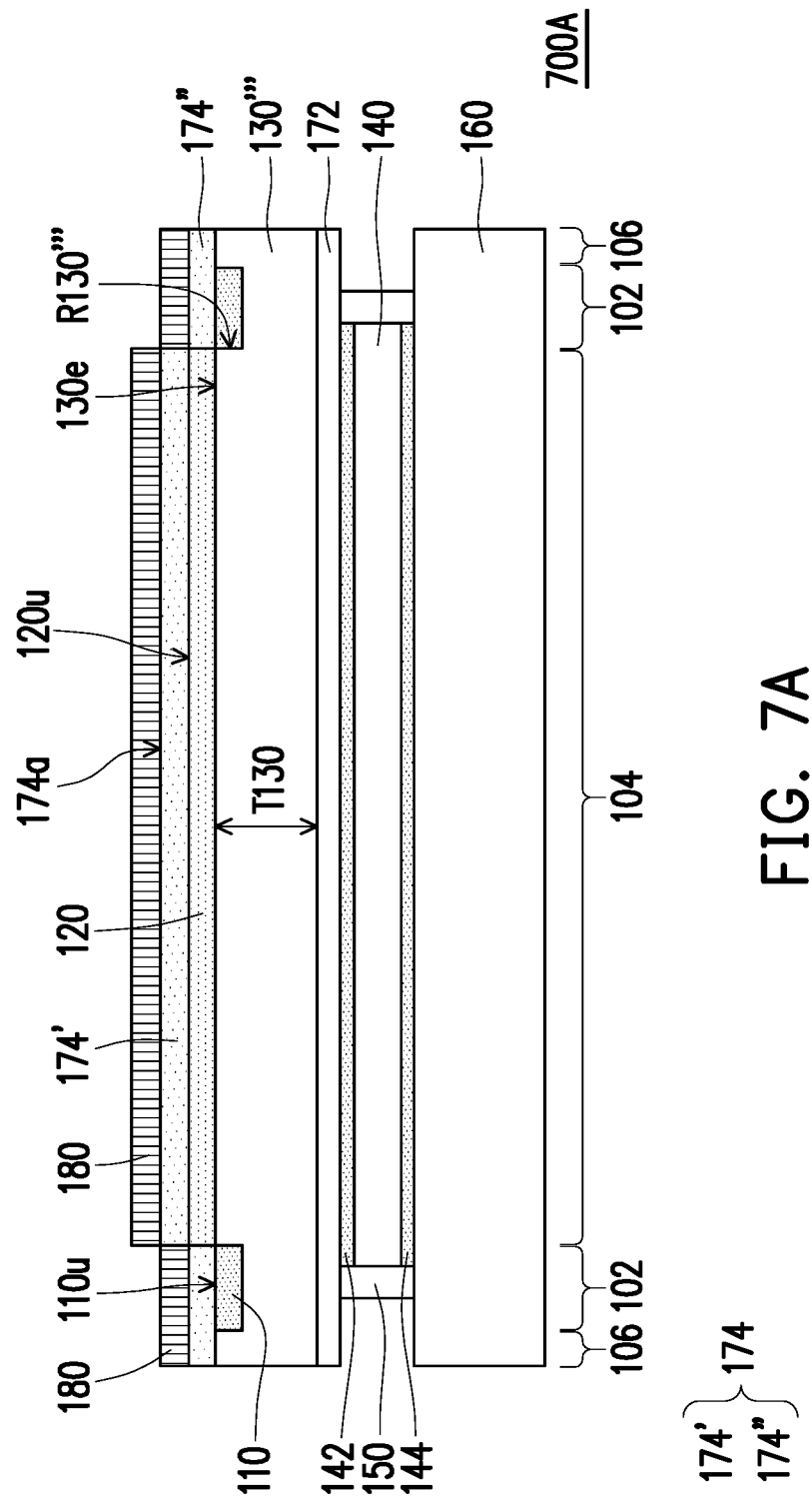
FIGS. 7A-7C show cross sections of a display panel according to some embodiments of the present disclosure.

In FIG. 7A is shown a cross section of a display panel 700A according to another embodiment of the present disclosure. The structure of the display panel 700A shown in FIG. 7A may be an implementing example of an embodiment of the present disclosure. The display panel 700A shown in FIG. 7A is similar to the display panel 600A shown in FIG. 6A and the same or similar reference numbers in the two embodiments represent the same or similar elements or components. Specifically, in the display panel 700A, the relative position of the portion 174' of the anti-reflective layer 174 and the light filtering layer 120 in the second region 102 are swapped when compared with the display panel 600A. That is, in display panel 700A, the light filtering layer 120 is sandwiched between the top substrate 130''' and the portion 174' of the anti-reflective layer 174. The two portions 174' and 174" of the anti-reflective layer 174 are not coplanar, as the portion 174' is disposed on the light filtering layer 120, whilst the portion 174" is disposed on the patterned light shielding layer 110 in the recess R130''' and the top substrate 130'''. Furthermore, the upper surface 120u of the light filtering layer 120 is in contact with the portion 174' of the anti-reflective layer 174, whilst the hydrophobic layer 180 is formed on the anti-reflective layer 174.

Figure 7B:
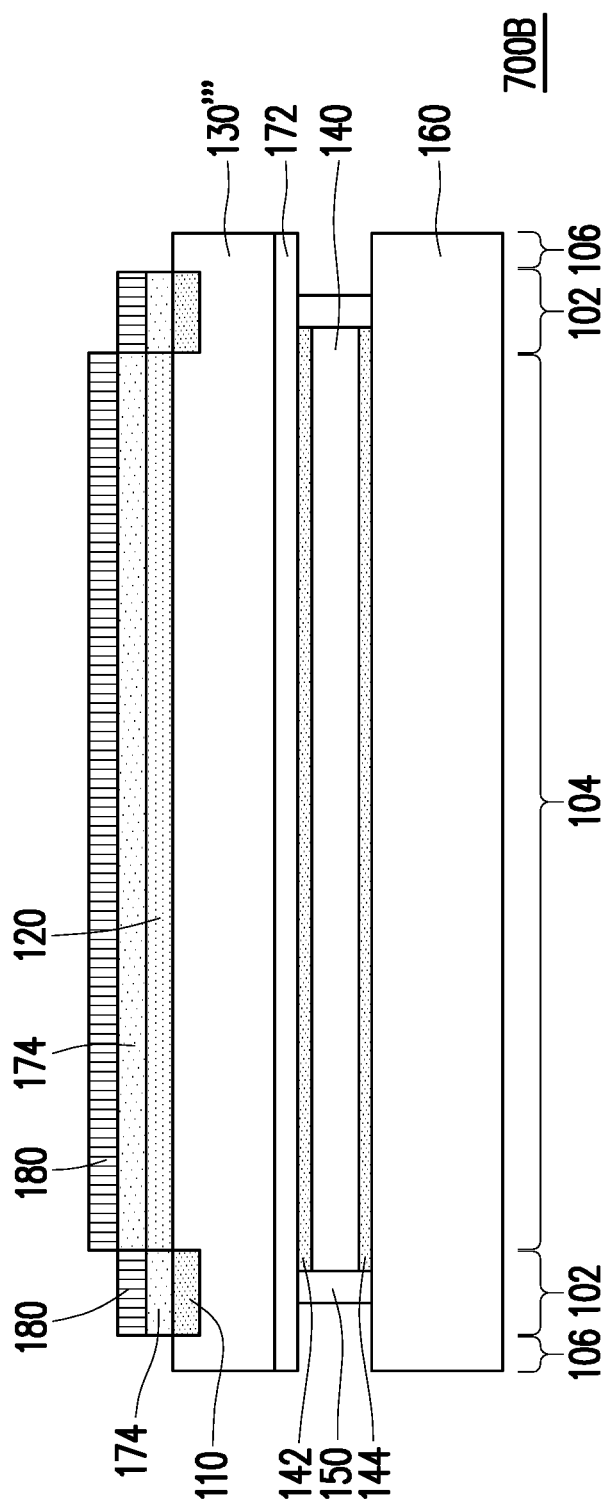

In FIG. 7B is shown a cross section of a display panel 700B according to another embodiment of the present disclosure. The structure of the display panel 700B shown in FIG. 7B may be an implementing example of an embodiment of the present disclosure. The display panel 700B is similar to the display panel 700A shown in FIG. 7A and the same or similar reference numbers in the two embodiments represent the same or similar elements or components. The display panel 700B differs from the display panel 700A in that the anti-reflective layer 174 and the hydrophobic layer 180 are blank and/or absent in the peripheral region 106 of the display panel 700B. That is, the anti-reflective layer 174 and the hydrophobic layer 180 do not cover the peripheral region 106 of the display panel 700B.

Figure 7C:
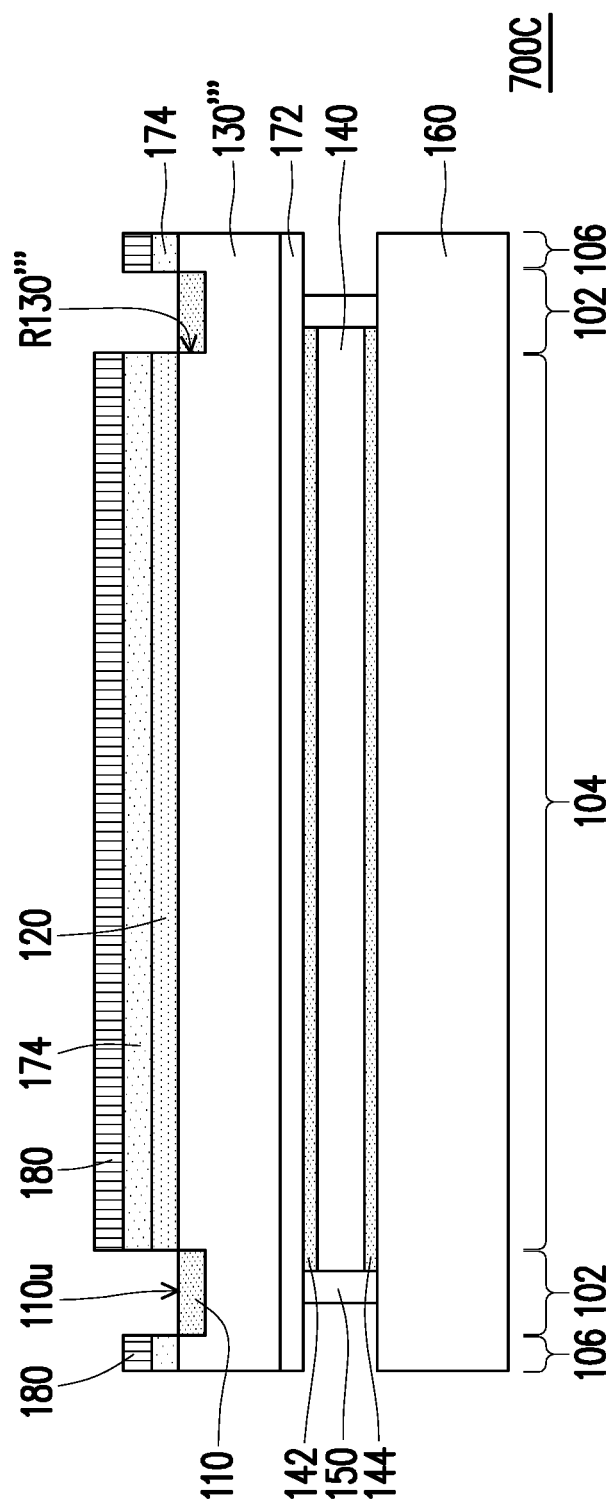

In FIG. 7C is shown a cross section of a display panel 700C according to another embodiment of the present disclosure. The structure of the display panel 700C shown in FIG. 7C may be an implementing example of an embodiment of the present disclosure. The display panel 700C of FIG. 7C is similar to the display panel 700A shown in FIG. 7A and the same or similar reference numbers in the two embodiments represent the same or similar elements or components. The display panel 700C differs from the display panel 700A in that the anti-reflective layer 174 and the hydrophobic layer 180 are blank in the first region 102. Therefore, the upper surface 110u of the patterned light shielding layer 110 formed in the recess R130''' is exposed.

In light of the foregoing, the display panel according to an embodiment of the disclosure includes a light filtering layer surrounded by a patterned light shielding layer on the top substrate. The light filtering layer may transmit at least about 80% of incident light of wavelength in the range from about 450 nm to 800 mn whilst reduce at least 20% of the transmittance of the light of wavelength in the range from about 250 nm to 410 nm. Accordingly, the light filtering layer may help to protect sensitive component of the display panel against photoinduced damages.

It will be apparent to those skilled in the art that various modifications and variations can be made to the structure of the present invention without departing from the scope or spirit of the invention. In view of the foregoing, it is intended that the present invention covers modifications and variations of this invention, provided these falls within the scope of the following claims and their equivalents. The display panels 400A, 400B, 400C, 400D, 500A, 500B, 500C, 600A, 600B, 600C, 700A, 700B, and 700C may be produced through similar steps as the ones previously described in the present disclosure.

What is claimed is:

1. A display panel, having a first region and a second region located beside the first region, the display panel comprising:
   a top substrate having a recess on an upper surface of the top substrate and the recess being located in at least one of the first region and the second region;
   a patterned light shielding layer disposed on the upper surface of the top substrate in the first region of the display panel;
   a light filtering layer, disposed on the top substrate in the second region of the display panel, wherein at least one of the patterned light shielding layer and the light filtering layer is accommodated in the recess of the top substrate, the light filtering layer causes a reduction of a transmittance of light of wavelength ranged from about 300 nm to about 410 nm by at least about 20% to about 50%, and a transmittance of the light filtering layer for light of wavelength ranged from about 450 nm to about 800 nm is at least about 80% to 95%;

a bottom substrate, disposed opposite to the top substrate;

a sealant, disposed between the top substrate and the bottom substrate and located within the first region of the display panel;

a display medium layer encased by the top substrate, the bottom substrate, and the sealant.

2. The display panel of claim 1, wherein the light filtering layer reveals the first region of the display panel.

3. The display panel of claim 1, wherein a transmittance of the light filtering layer for light of wavelength ranged from about 500 nm to about 800 nm is at least about 85% to 95%.

4. The display panel of claim 1, wherein a material of the light filtering layer is an inorganic material.

5. The display panel of claim 1, wherein a material of the light filtering layer comprises ZnO or doped ZnO with magnesium.

6. The display panel of claim 1, wherein the light filtering layer is constituted by a plurality of thin films, and different thin films of the plurality of thin films comprise different materials.

7. The display panel of claim 1, further comprising an anti-reflective layer disposed on the upper surface of the top substrate in the second region of the display.

8. The display panel of claim 7, wherein the patterned light shielding layer in the first region of the display panel is coplanar with a portion of the anti-reflective layer in the second region of the display panel.

9. The display panel of claim 7, wherein the anti-reflective layer further extends in the first region of the display panel, and is in contact with the patterned light shielding layer.

10. The display panel of claim 7, wherein the light filtering layer is in contact with the anti-reflective layer.

11. The display panel of claim 1, further comprising a hydrophobic layer extending on the second region of the display panel.

12. The display panel of claim 1, further comprising an alignment layer contacting the display medium layer, and the alignment layer is made of an organic material.

13. A method of fabricating a display panel comprising:
assembling a top substrate with a bottom substrate through a sealant, wherein the sealant is located in a first region surrounding and beside a second region;
forming a display medium layer between the top substrate and the bottom substrate in the second region, wherein the display medium layer is encased by the top substrate, the bottom substrate and the sealant;
forming a light filtering layer on the upper surface of the top substrate in the second region, the light filtering layer causes a reduction of a transmittance of light of wavelength ranged from about 300 nm to about 410 nm by at least about 20% to about 50%, and a transmittance of the light filtering layer for light of wavelength ranged from about 450 nm to about 800 nm is at least about 80% to 95%;
forming a patterned light shielding layer on the upper surface of the top substrate in the first region; and
removing a portion of the top substrate before forming the light filtering layer and the light shielding layer to form a recess on the upper surface of the top substrate, wherein at least one of the light filtering layer and the patterned light shielding layer is disposed in the recess.

14. The method of claim 13, wherein the sealant is a UV-curable sealant.

15. The method of claim 14, wherein the light filtering layer is formed before curing the sealant and the light filtering layer reveals the first region.

16. The method of claim 14, wherein during curing the sealant, a mask is used for shielding the second region and the mask is removed after the sealant is cured.

17. The method of claim 14, further forming an alignment layer contacting the display medium layer in the second region, and a material of the alignment layer is an organic material.

18. The method of claim 13, further comprising annealing the light filtering layer at a temperature in a range from about 150° C. to about 400° C. for a time in a range from about 10 minutes to about 3 hours.

19. The method of claim 13, further comprising forming an anti-reflective layer on the upper surface of the top substrate.

20. The method of claim 13, further comprising forming a hydrophobic layer before forming the patterned light shielding layer, wherein the hydrophobic layer is blank in the first region.

* * * * *